United States Patent
Rachford, Jr. et al.

(10) Patent No.: US 6,701,223 B1
(45) Date of Patent: Mar. 2, 2004

(54) METHOD AND APPARATUS FOR DETERMINING OPTIMAL CONTROL SETTINGS OF A PIPELINE

(75) Inventors: Henry R. Rachford, Jr., Houston, TX (US); Richard G. Carter, Houston, TX (US)

(73) Assignee: Advantica, Inc., Carlisle, PA (US)

( * ) Notice: Subject to any disclaimer, the term of this patent is extended or adjusted under 35 U.S.C. 154(b) by 399 days.

(21) Appl. No.: 09/659,497

(22) Filed: Sep. 11, 2000

(51) Int. Cl.[7] .......................... G05D 16/00; G05D 23/00
(52) U.S. Cl. ........................ 700/301; 700/299; 700/304; 700/281; 700/282; 700/289; 700/28; 700/46; 700/36; 702/100; 702/45; 702/47; 137/8; 137/45; 137/47
(58) Field of Search ............................. 700/28, 46, 36, 700/301, 304, 299, 281, 282, 289; 702/100, 45, 47; 137/8, 45, 47

(56) References Cited

U.S. PATENT DOCUMENTS

| | | | | |
|---|---|---|---|---|
| 3,752,393 A | * | 8/1973 | Moseley ..................... 702/45 |
| 3,952,759 A | * | 4/1976 | Ottenstein .................... 137/12 |
| 4,180,083 A | * | 12/1979 | Miyaoka et al. ........ 137/101.25 |
| 4,527,600 A | * | 7/1985 | Fisher et al. ................. 700/301 |
| 4,835,687 A | * | 5/1989 | Martin .......................... 705/7 |
| 4,928,255 A | * | 5/1990 | Brennecke et al. .......... 700/301 |
| 5,308,909 A | | 5/1994 | Chen, Sr. et al. ............ 524/494 |
| 5,343,758 A | * | 9/1994 | Ingrain et al. ............. 73/861.02 |
| 5,524,084 A | * | 6/1996 | Wang et al. ................. 702/100 |
| 5,633,809 A | | 5/1997 | Wissenbach et al. ....... 364/510 |
| 5,677,500 A | * | 10/1997 | Ackerley et al. ........... 73/865.9 |
| 5,774,372 A | * | 6/1998 | Berwanger ................... 700/301 |
| 5,963,883 A | * | 10/1999 | Cunkelman et al. ........... 702/47 |
| 5,992,229 A | * | 11/1999 | Pyotsia et al. ................. 73/168 |
| 6,062,256 A | * | 5/2000 | Miller et al. ............. 137/487.5 |
| 6,112,137 A | * | 8/2000 | McCarty et al. ............. 700/301 |
| 6,203,631 B1 | * | 3/2001 | Bowen et al. ............... 148/336 |
| 6,236,894 B1 | * | 5/2001 | Stoisits et al. ................ 700/28 |

* cited by examiner

Primary Examiner—Ramesh Patel
Assistant Examiner—Thomas Pham
(74) Attorney, Agent, or Firm—Brian T. Sattizahn; McNees Wallace & Nurick LLC

(57) ABSTRACT

Pipelines are controlled by specifying operations along them. Control specifies sequential control values defining operations at each station to control the pipeline state. The time-dependent state is determinable by software calculations using continuous measurements along the pipeline. Forecasted deliveries dictate that the current pipeline state must change by future time (T). Control sequences are determined at pipeline stations to exercise optimum pipeline control while achieving predetermined goals from the current state to a sustainable target state which supports future deliveries by simulating current pipeline states through time interval T, while satisfying time-dependent forecast deliveries. An initial computable control set is iteratively improved and evaluated by computing the gradient of pipeline operational cost, costs of missing target(s), and costs of violating constraints by solving an adjoint problem each time the simulation is made. The gradient information, using second-order approximations to the N-dimensional cost, rapidly produces optimizing solutions using an accelerated iteration.

39 Claims, 21 Drawing Sheets

METHOD AND APPARATUS FOR DETERMINING OPTIMAL CONTROL SETTINGS OF A PIPELINE

FIELD OF THE INVENTION

The present invention relates generally to the optimization of control settings for compressors and/or regulators in a gas pipeline to transition the gas pipeline from an initial state to a target state.

BACKGROUND OF THE INVENTION

Present industry technology for minimizing gas transmission cost in a gas pipeline focuses on optimizing the choice of which of available compressor units to run, and determining values for their pressure control set points. Their objective is to minimize the cost of delivering gas at specified rates and locations while satisfying delivery and supply pressure constraints. The problem and its solution are framed in a steady-state context.

When load or supply conditions change, the optimized solution may no longer apply, and a new set of pressure control set points must be determined. Thus, the operator of the pipeline must transit from the current state of the pipeline to provide for the condition changes. For any given state of the pipeline system and the corresponding load or supply condition changes, the question of realizing an optimum of cost and fuel savings during the transition involves two parts: first, what is a new optimum or target state of the pipeline incorporating the load or supply condition changes, and second, what is the optimum path to attain the new optimum state.

There are software applications available that yield an optimum or target steady state mode of operation for projected load and supply conditions. In addition, there are software applications available for determining the current state of a pipeline system. However, no effective solution has been found for determining the optimum path to reach the optimum state of the pipeline for projected load and supply conditions. Because of significant relaxation times (usually many hours) for long gas pipeline systems, substantial fuel cost will be incurred during the transition to the new optimum state. This cost might be large compared with the anticipated savings at the new optimum state if the transition is not made efficiently.

U.S. Pat. No. 4,835,687 to Martin discloses a system for the optimized management of a pipeline system in real time. In Martin, the control for the pipeline is determined by calculating the pressure and flow rates at important system locations and then determining the corresponding equipment, i.e. compressors, valves, etc., to be used to obtain the calculated pressure and flow rates. The control is then tested to determine whether or not it is feasible for the existing equipment. If feasible, an optimization function is computed taking into account certain optimization criteria such as power consumption and flow rates. The optimization function is a linear combination of various optimization criteria each having corresponding coefficients. The higher the coefficient, the more important the optimization criteria. The optimization function is a function of the state vector that represents the pressures, flow rates and adjustments at important system locations. Convergence of the function is checked and the adjustments to the pipeline system are carried out if the function converges. Optimization of the function occurs using a generalized reduced gradient algorithm. Next, the gradient of the downward processing is checked to see if it is zero. If the gradient is not zero, then optimum points for downward processing of the optimization function are determined and the process is repeated. However, the process is not repeated if the achievement of optimization exceeds the possibilities of real-time computation of the system and optimization is deemed impossible.

If the optimization is deemed impossible due to computational resource constraints, then a pre-computed solution is implemented on the pipeline system, which is not an optimal solution and may not match actual loads.

In practice, Martin suffers several deficiencies. The most serious of these is the inventory problem. Briefly, the inventory problem results from reducing costs over the optimizing transition period. A true optimization will leave the pipeline inoperable at the end of the transition period because inventory (pressure) will have been depleted. It is analogous to the grocer who optimizes profits during the month of March by not replacing inventory sold, so he is out of business April 1.

A second deficiency is that Martin does not teach how to efficiently compute the required gradient. Computation of the gradient from basic principles is impractically slow, requiring thousands of times more computer resources than are available for practical size field problems.

A third deficiency is that Martin does not teach the efficient acceleration of the prescribed generalized gradient iteration. This acceleration combined with an efficient gradient evaluation is essential in solving optimizations in field problems faster than real time.

Therefore, what is needed is a system and technique that addresses these deficiencies and does not require the use of precomputed solutions which may only be available for a very limited number of load combination scenarios.

BRIEF SUMMARY OF THE INVENTION

The present invention determines an optimal set of controls for devices in a pipeline to transit the pipeline from an initial state to a target state over a pre-selected time period, T. A set of controls is a collection of numbers corresponding to a discrete set of time values over interval T for each control station or device in the pipeline system. A control station or device might be a compressor or regulator valve station. The state of the pipeline is the set of pressures and gas velocities at a large representative number of points in the pipeline system. These representative points may be the pressures and velocities at each milepost in the system. (A milepost is simply a marker to define pipeline locations on 1-mile spacing). The target state of the pipeline can be computed in two different ways that can be selected by a user. The target state can be computed externally as a steady state for the pipeline, usually an optimum steady state for the loads (gas deliveries) at the end of time interval T. Alternatively, the target state can be an internally computed state required not to change over a final period $\alpha T$ to T, where $\alpha$ is a suitable number somewhat less than one, but satisfying the prescribed loads at T, and thereby yielding a steady (and thus sustainable) state between $\alpha T$ and T.

The present invention begins by obtaining the initial state of the pipeline from appropriately processed measurements from the field. It generates an initial set of controls and simulates the application of the set of controls on the devices in the pipeline over the pre-selected time period, T, using the initial state information previously obtained and satisfying a set of time-dependent loads (deliveries) at stated points designated throughout the system. The cost for the simulated application of the set of controls is calculated using a cost functional.

A cost functional is a rule for assigning a cost to the set of pipeline states encountered during simulation of the transition from the initial state to time T using a particular control set. For example, at a compressor station the inlet (suction) pressure and discharge velocity and pressure imply a certain theoretical horsepower usage. This theoretical power combined with a machine efficiency and fuel cost imply a cost for the station operation corresponding to this state. Other elements may add to the costs as will be described later. The total cost functional for the simulated period T is the aggregate costs summed over the simulated states achieved during period T.

After the cost for the simulation using a particular control set is calculated, a gradient is determined for that set. The gradient is the vector of numbers comprised of the derivative of the total cost functional with respect to each of the control values in the control set. The set of controls is then modified using the gradient to generate an updated set of controls for the devices in the pipeline. The steps of simulating, calculating, determining and modifying using the updated set of controls are repeated until the updated set of controls is an optimal set of controls. The optimal set of controls is a set of controls that has a minimum cost. Finally, the optimal set of controls is applied to the pipeline to transition the pipeline from the initial state to the target state.

One embodiment of the present invention is directed to a method of formulating an optimal set of controls to transit a pipeline from an initial state to a sustainable target state over a preselected time period. The pipeline comprises a plurality of control devices and the preselected time period has a plurality of discrete intermediate times. First, a set of controls capable of transitioning the pipeline from the initial state to some resulting state at later-time T is chosen. The set of controls has a plurality of control values for each control device of the plurality of control devices and each control value of the plurality of control values for each control device corresponds to a discrete intermediate time of the plurality of discrete intermediate times.

Next, states of the pipeline are simulated using the set of controls from the start of the preselected time period to the end of the preselected time period. The state of the pipeline includes a plurality of state variables representing conditions of the pipeline at discrete points along the pipeline. A total cost for the simulated set of controls is calculated using a cost functional. This cost functional includes a positive value which is a measure of how far the simulated state after time T differs from the required target state or condition. The set of controls is modified to generate an updated set of controls having a lower calculated total cost. Finally, the steps of simulating, calculating, and modifying are repeated with updated sets of controls until the updated set of controls is an optimal set of controls, wherein the optimal set of controls has a minimum total cost and the target state closely approximate.

Another embodiment of the present invention is directed to a method for computing a cost gradient for a control set for use in generating an optimal control set to transit a pipeline from an initial state to a sustainable target state over a preselected time period having a plurality of discrete intermediate times. To begin, a state of the pipeline is simulated at each of the plurality of discrete intermediate times from the start of the preselected time period to the end of the preselected time period using the set of controls. The state of the pipeline has a plurality of state variables representing conditions of the pipeline at discrete points along the pipeline. A cost associated with the state of the pipeline at each of the plurality of discrete intermediate times and at the end of the preselected time period is then calculated. Next, derivatives of the cost associated with the state of the pipeline at each of the plurality of discrete intermediate times and with the state of the pipeline at the end of the preselected time period are evaluated with respect to the plurality of state variables. Beginning at the end of the preselected time period, an adjoint solution is evaluated with the evaluated derivatives and proceeding back to the start of the preselected time period time by incorporating the evaluated derivatives from each of the plurality of discrete intermediate times. Finally, the adjoint solutions evaluated at the plurality of discrete intermediate times from the end of the preselected time period to the start of the preselected time period are combined to generate a cost gradient.

Still another embodiment of the present invention is directed to a method of transitioning a pipeline from a first state to a second state over a predetermined time period. To start, the predetermined time period is divided into a plurality of discrete time segments. A first state of the pipeline is calculated at the start of the predetermined time period. The state of the pipeline has a plurality of state variables representing conditions of the pipeline at discrete points along the pipeline. A second state of the pipeline to be achieved at the end of the predetermined time period is also calculated. A valid and feasible set of controls capable of transitioning the pipeline from the first state of the pipeline to a final state of the pipeline at the end of the predetermined time period is generated. A state of the pipeline at each of the plurality of discrete time segments is simulated from the first state of the pipeline at the start of the predetermined time period to the final state of the pipeline at the end of the predetermined time period using the valid and feasible set of controls. A cost associated with the state of the pipeline is calculated at each of the plurality of discrete time segments and with the final state of the pipeline at the end of the predetermined time period and the costs are then summed to determine a total cost for the valid and feasible set of controls, Next, first derivatives and second derivatives of the cost associated with the state of the pipeline at each of the plurality of discrete time segments and with the final state of the pipeline at the end of the predetermined time period are evaluated with respect to the plurality of state variables. An adjoint solution with the evaluated first derivatives and proceeding back to the start of the predetermined time period time by incorporating the evaluated first derivatives from each of the plurality of discrete time segments are evaluated beginning at the end of the predetermined time period. The adjoint solutions evaluated at the plurality of discrete time segments from the end of the predetermined time period to the start of the predetermined time period are combined to generate a gradient. The set of controls is then modified using the gradient and the second derivatives to generate an updated set of controls having a lower total cost. Finally, the steps of simulating, calculating, evaluating first and second derivatives, evaluating an adjoint solution, combining the adjoint solutions and modifying with updated sets of controls are repeated until the updated set of controls is an optimal set of controls, wherein the optimal set of controls has a minimum total cost.

Yet another embodiment of the present invention is directed to a computer program product embodied on a computer readable medium and executable by a computer for determining an optimal set of controls for devices in a pipeline to transition the pipeline from a first state to a sustainable second state over a preselected time period. The computer program product includes instructions for executing the steps of dividing the preselected time period into a plurality of discrete intermediate times and generating a valid and feasible set of controls capable of transitioning the pipeline from the first state of the pipeline to a final state of the pipeline at the end of the preselected time period. The computer program product also has instructions for executing the steps of simulating a state of the pipeline at each of the plurality of discrete intermediate times from the first state of the pipeline at the start of the preselected time period to the final state of the pipeline at the end of the preselected time period using the valid and feasible set of controls. The state of the pipeline includes a plurality of state variables representing conditions of the pipeline at discrete points along the pipeline. The computer program product has further instructions for executing the steps of calculating a total cost for the simulated set of controls using a cost functional, computing a gradient of the cost functional, modifying the set of controls using the gradient to generate an updated set of controls having a lower calculated total cost and repeating said steps of simulating, calculating, computing and modifying with updated sets of controls until the updated set of controls is an optimal set of controls, wherein the optimal set of controls has a minimum total cost.

A further embodiment of the present invention is directed to a system for determining an optimal set of control values for control devices in a pipeline to transition the pipeline from a first state to a second state over a predetermined time period. The system includes a plurality of sensors located on the pipeline to measure characteristics of the pipeline and a control and data acquisition system to receive measurements from the plurality of sensors and to apply control values to the control devices of the pipeline. The system also has a pipeline state calculator to generate the first state of the pipeline at the start of the predetermined time period using the measurements received by said control and data acquisition system and a load forecaster to predict future loads at specific points along the pipeline. In addition, the system has a control set optimizer to generate an optimal control set for the control devices of the pipeline. The control set optimizer uses a starting control set, the first state of the pipeline from the pipeline state calculator, the second state of the pipeline and the predicted future loads from the load forecaster to generate said optimal control set. Finally, the optimal control set is transmitted to said control and data acquisition system for application to the control devices of the pipeline.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

Figure 1:
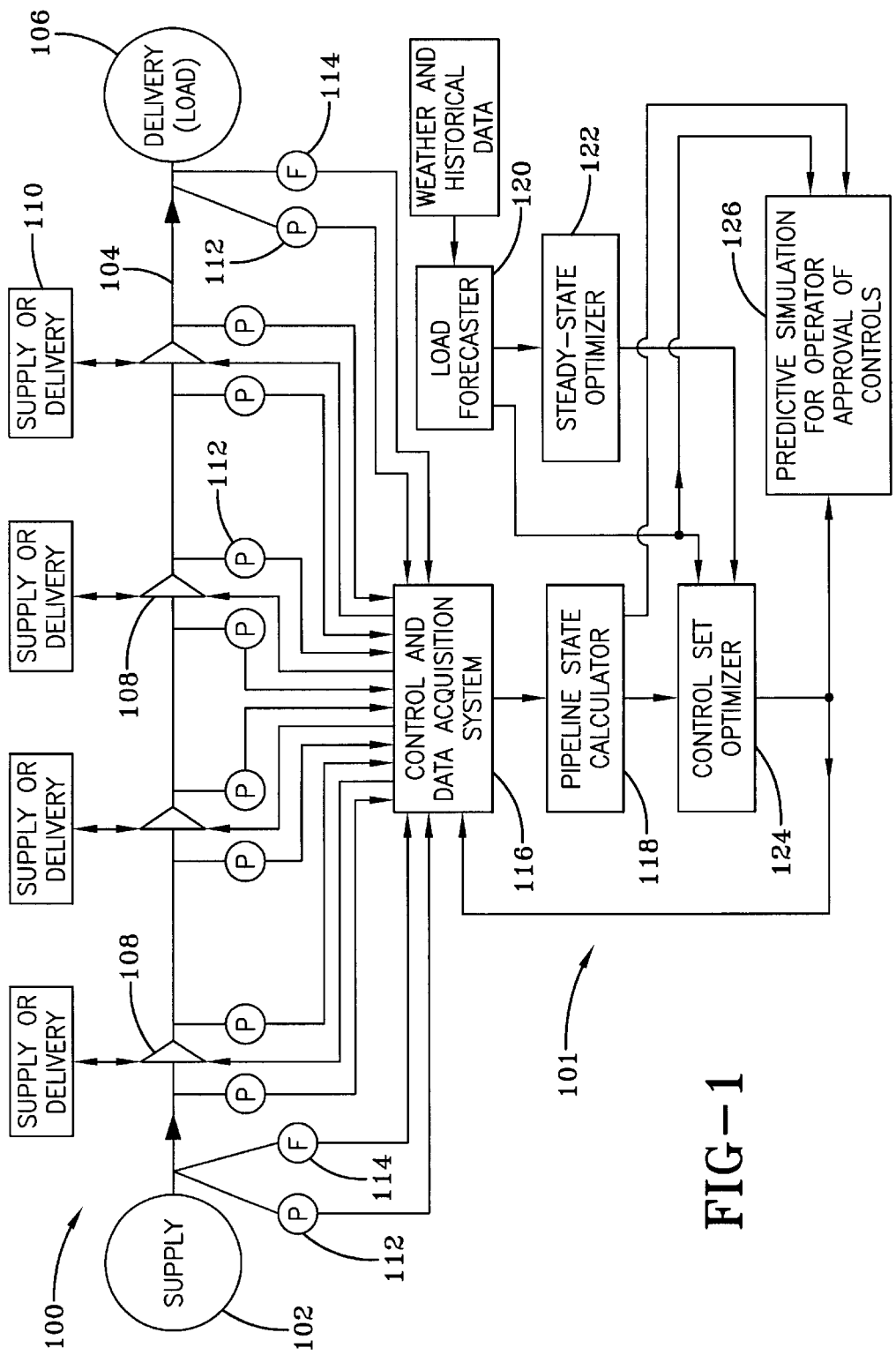
FIG. 1 illustrates an overview of the present invention and how it is related to the pipeline system.

FIG. 1 illustrates the pipeline system 100 and the computer system 101 used in controlling the pipeline system 100. The pipeline system 100 of FIG. 1 is shown in a gunbarrel configuration, i.e. a substantially straight or linear configuration of the pipeline with no connected branches. However, it is to be understood that the pipeline system 100 can have a variety of different configurations including looped and branched systems. The only requirement for the application of the present invention is that the field pipeline structure be known in sufficient detail that a simulation of the pipeline state over a period T can be effected accurately.

In addition, the different systems and functions of the computer system 101, to be described in greater detail below, are illustrated schematically in FIG. 1 with separate boxes. It is to be understood that all the systems and functions included in computer system 101 can be implemented on a single computer with one or more central processing units (CPUs) or can be implemented on multiple computers each having one or more CPUs. Further, it is to be understood that each system or function of computer system 101 can have its own dedicated computer. However, it is also to be understood that one computer may be dedicated to executing or performing several of the systems or functions of computer system 101.

In one embodiment of the present invention and in the test cases forming the basis of FIGS. 6 through 13, which cases will be discussed in greater detail below, a computer, an IBM-PC, operating at 500 MHz using the Microsoft NT operating system is used. However, other types of computers (e.g. Sun, Apple, etc.) operating at different speeds and utilizing different operating systems (e.g. Unix, MacOS, etc.) can also be used. The program is written in non-optimized C++, however, other programming languages can be used such as Java, Fortran, etc. Typical execution times for determining the optimum solution for the cases studied was 15 minutes using a fixed 15-second time step for the simulation, or roughly thirty times faster than real time. Execution times for the subject system using variable time step for the simulation are less than three minutes, or in excess of 160 times faster than real time.

The pipeline system 100 has an initial supply source 102 that is connected by a pipeline 104 to a final delivery point 106. The pipeline 104 can utilize a plurality of compressor and/or regulator stations 108 to control the flow rate and pressure of the gas in the pipeline 104. There can be additional supply or delivery points 110 connected to the pipeline 104 through the compressors and/or regulators 108 to add or subtract gas to the pipeline 104 besides the initial supply source 102 and the final delivery point 106. The source or delivery points 110 shown in FIG. 1 are for illustration only and may be positioned at any location along the pipeline 104. To obtain measurements about the initial state of the pipeline 104 and the pipeline system 100 several pressure sensors 112 and flow sensors 114 are inserted at appropriate locations in the pipeline 104.

The pressure sensors 112 and the flow sensors 114 transmit the measured pressure and flow rate information back to the computer system 101. A control and data acquisition system (CDAS) 116 is used to receive the transmitted pressure and flow rate information. The control and data acquisition system 116 is also preferably used to transmit signals to the compressors and/or regulators 108 to impose control settings for the compressors and/or regulators 108 in the pipeline 104. In a preferred embodiment, the control and data acquisition system or CDAS 116 is a pre-existing commercial application such as the SCADA (Supervisory Control And Data Acquisition) system manufactured by and made available by many competing suppliers.

The pressure and flow rate information received by the CDAS 116 is then transferred to a pipeline state calculator 118. The pipeline state calculator 118 uses the pressure and flow rate information received from the CDAS 116 and calculates or infers the current state of the pipeline system 100, which is represented by a plurality of state variables. In a preferred embodiment, the pipeline state calculator 118 is a pre-existing software application such as STATEFINDER manufactured by Stoner Associates, Inc. of Carlisle, Pa., although any other similar type of pipeline state calculator software application which correctly infers the state of the pipeline can also be used.

In another embodiment of the present invention, additional sensors besides pressure sensors 112 and flow sensors 114 can be inserted into the pipeline 104 to obtain measurements on other characteristics of the pipeline 104. For example, temperature sensors could be inserted in the pipeline 104 to measure the temperature or composition of the gas. The additional sensors can transmit the additional measurement information to the CDAS 116 and then be subsequently used by the pipeline state calculator 118 in determining additional state variables such as temperature and gas composition comprising the current state of the pipeline system 100 as may be needed for an accurate simulation of the hydraulic states during a period T.

The computer system 101 also has a load forecaster 120 and optionally a steady-state optimizer 122. The load forecaster 120 preferably uses historical data and weather predictions or forecasts to generate realistic expectations of the required demands at specific points on the pipeline system 100 as functions of time into the future. It is required that forecasts of the corresponding rates or time-dependent loads be available at each location or point so that an accurate simulation of the pipeline states during period T can be effected. In a preferred embodiment, the load forecaster 120 is a pre-existing commercially available software application that can provide forecasts of the pipeline system 100 loads, i.e. the delivery or supply rates for the pipeline system 100. Several load forecaster programs are available commercially. The optional steady-state optimizer 122 receives future long term predictions of the average loads beyond a certain time and then computes the optimum sustainable state or target state of the pipeline system 100 to supply such future loads. The target state will preferably contain values for gas velocities and pressures at pre-selected locations in the pipeline system 100, typically at each milepost or other set of points with sufficient density to define the state adequately. In a preferred embodiment, the steady-state optimizer 122 is a pre-existing software application such as EMM manufactured by Stoner Associates, Inc. of Carlisle, Pa., although any other similar type of steady-state optimizer software application can also be used. If an optional externally generated steady state target is not provided, the target state will be computed internally.

The choice of whether to use an optional externally computed steady state target will be dependent on the details of the pipeline in question. An internally computed target will be preferable for pipelines in constant flux, while an externally computed target allows the user to take advantage of particular features of existing steady state solvers, such as a dynamic programming methodology for a more advanced treatment of discrete equipment combinatorics.

In a preferred embodiment of the present invention, the computer system 101 also has a control set optimizer 124 for determining a set of optimal controls as described by the accelerated iterative process described below. This set of controls is transmitted to the CDAS 116 to control each of the compressors and/or regulators 108 to transition the state of the pipeline system 100 over the preselected time period (the transition time T). The determined optimum set of controls can preferably transition the pipeline system 100 from the initial state to the target state in the transition time (T), not use more power than is available at any one compressor station 108, keep all pressures in the pipeline system 100 within constrained limits and minimize fuel and/or power consumption over the transition time (T). The control set optimizer 124 receives as inputs the initial state of the pipeline system 100 as determined by the pipeline state calculator 118, the predicted expectations of the required demands at specific points in the pipeline system 100 as functions of time into the future as determined by the load forecaster 120 and the optimum sustainable steady state of the pipeline system 100 at the end of the transition time (T) as determined by the steady state optimizer 124 or the internally-generated steady target state. The optimal target state is used to avoid energy and product inventory depletion during the transition time (T). However, the internally generated steady state or any other sustainable target state can similarly be used to avoid inventory depletion. The set of optimized controls can be determined to optimize the pipeline system 100, i.e. minimize a corresponding cost, in a variety of different ways that is specified by the operator of the computer system 101. Some examples of different optimizations that may be implemented are the minimization of the use of fuel during the transition time (T) and the minimization or shifting of power usage of the compressors 108 based on the availability of the compressors 108. The steps used by the control set optimizer 124 to determine the set of optimum controls is explained in greater detail below with regard to FIGS. 2–4.

It should be noted that any operational activity subject to a quantifiable cost can be optimized. For example, in a typical pipeline system there are differing categories of load. Some loads are non-interruptible, demand dependent, meaning that the purchaser of the gas may, at his discretion, take up to his contract limiting rate of delivery at any time. To provide flexibility to supply such loads, other load contracts are written as interruptible, i.e. the operator may divert gas from interruptible loads to supply non-interruptible loads. There are costs associated with such interruption, and these costs are quantifiable. Thus, the loads to interrupt, the timing of the interruptions and the amount of interruptions may be included in the optimization goals during the transition period T.

After the control set optimizer 124 determines the set of optimum controls for the compressors and/or regulators 108 in pipeline system 100, the set of optimum controls is transmitted to a predictive simulation system 126. The predictive simulation system 126 is used by the operator or user of the computer system 101 to test the set of optimum controls to determine their effect on the pipeline system 100 without actually having to implement the set of optimum controls. The predictive simulation system 126 uses a simulation model of the pipeline system 100, the initial state of the pipeline system 100 as determined by the pipeline state calculator 118 and the generated expectations of required demands on the pipeline system 100 as determined by the load forecaster 120. Preferably, the predictive simulation system can execute substantially faster, about 100 to 1000 times faster, than real time, permitting assessment of the results before the set of optimum controls is scheduled to take effect. In a preferred embodiment, the predictive simulation system 126 is a pre-existing software application such as PREDICTOR, although any other similar type of pipeline simulator software application can be used. The predictive simulation system 126 basically performs the same simulation over period T that is performed in the simulation step by the control set optimizer 124, which is described in greater detail below.

Figure 2:
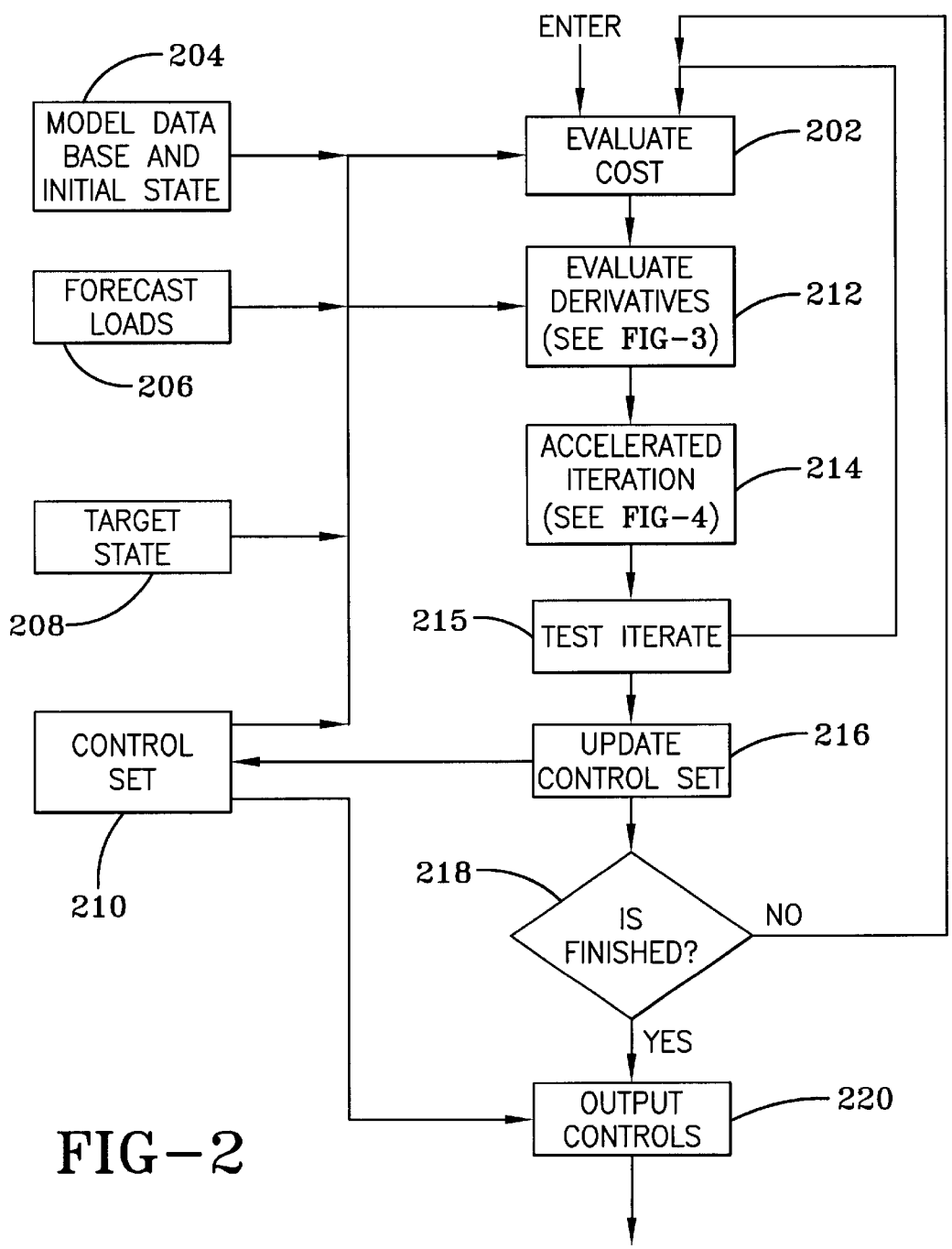
FIG. 2 is a flow chart that illustrates the basic steps of the present invention.

FIG. 2 illustrates the steps preferably utilized by the control set optimizer 124 in determining the set of optimized controls. Initially, the control set optimizer 124 receives information related to the pipeline system 100 to be used in determining the set of optimized controls. The information related to the pipeline system 100 includes: the initial state of the pipeline system 100; model database information 204; forecast load information 206 for the pipeline system 100; target state information 208, whether the sustainable target state is generated externally or internally; and a control set 210 of controls for the compressors and/or regulators 108. The model database 204 includes information about the physical description of the pipeline system 100, such as the size of the pipes used, the available power at compressor and/or regulator stations 108, and other constraint information. Constraints are conditions that must not be violated during operation of the pipeline system 100, such as minimum and maximum pressures allowable in the pipeline 104 or the power available to the compressor/regulator 108. Other constraints may also be imposed. For example, there may be a contract maximum flow rate permissible at initial supply source 102, or there may be a maximum discharge rate permissible at each of the compressor and/or regulator stations 108. These permissible rates may apply only during certain times during the transition period T. In general, any contractual or operational constraint measurable in terms of the pipeline state variables may be subjected to time-dependent constraints. The forecast load information 206 is received from the load forecaster 120. The target state 208 is received from the steady-state optimizer 122 or is computed internally by targeting a steady state at a period prior to the time T. The control set 210 is the set of set points for each compressor and/or regulator station 108 at a discrete set of time values during the transition time (T) to be obtained or met by each compressor and/or regulator unit 108 to achieve the optimal target state 208 by the end of the transition time (T).

The control set 210 is preferably initialized as a reasonable set of values that allow the initial simulation to proceed to the end of transition time T. For example, the control set 210 can control the discharge pressures, discharge flow rates, suction or inlet pressure, suction flow rate, the theoretical station power, the station fuel, or any other similar type of attribute of the compressors and/or regulators 108. Preferably, each compressor and/or regulator 108 can have the same number of values, set points or settings in the control set 210, which values, set points or settings are designated or assigned at pre-selected time intervals of equal spacing over the transition time (T). However, the pre-selected time intervals do not have to have equal spacing over the transition time (T) and can be of varying length. Furthermore, each compressor and/or regulator 108 may not require the same number of settings or values over the transition time to reach the target state 208. In other words, one compressor and/or regulator 108 may require more values or settings to reach the target state 208 of the pipeline system 100 than other compressors and/or regulators 108.

In a preferred embodiment of the present invention, the number of values in the control set is equal to the number of compressors and/or regulators 108 in the pipeline system multiplied by the number of time intervals in the transition time (T). To illustrate one example, there can be seven compressors in the pipeline system and the values for the set points of the compressors can be designated every fifteen minutes over an eight hour transition time (T) for a total of thirty two time intervals for each compressor and/or regulator 108. Therefore, multiplying the 32 time intervals by the seven compressors results in 224 total settings or values in the control set 210 for the foregoing example.

For the time periods in between the designated values, each compressor and/or regulator 108 can then interpolate the needed values or settings to reach the next value or setting in the control set 210. In a preferred embodiment of the present invention, for the intermediate times between the settings, set points or values in the control set 210 for each compressor and/or regulator 108, the intermediate settings or values are ramped linearly in time between adjacent values. To illustrate, if the discharge pressure setting for a compressor is 500 pounds per square inch (psi) at one time interval and the discharge pressure setting to be reached at the next time interval, fifteen minutes later, is 560 psi for that compressor, then that compressor would have to increase its discharge pressure setting by 4 psi per minute to reach the setting at the next time interval. Other interpolation techniques besides a linear interpolation between set values can be used.

In a preferred embodiment, the control set 210 will initially be a control set from the most recent prior execution of the control set optimizer 124, however, any arbitrary valid control set can be used initially. A valid control set is any control set that will result in completion of the hydraulic simulation over the transition period (T). A feasible control set is one that results in the simulated results meeting all of the deliveries and constraints on the pipeline system 100. To illustrate, a hydraulically simulatable system is one where there is sufficient output pressures or flows from one compressor and/or regulator 108 to physically satisfy the flow or pressure requirements at the next compressor and/or regulator 108. After validating the initial control set 210 to be one which allows simulation to proceed through the transition time (T), the procedure outlined in FIG. 2 is initiated to improve the control set repeatedly until an optimum set (which must also be feasible) is achieved.

In step 202 of the procedure outlined in FIG. 2, the control set optimizer 124 assigns costs to the control set 210 during a simulation of the pipeline system 100. Recall that the optimization process of the present invention is based upon a minimization of costs. The cost includes a quantification of items to be reduced, such as the total fuel usage times its unit price. It could also include the dollar cost of interruptible contract gas not delivered. In addition, cost would include a penalty for failure to achieve the target state. If the target state is input as data from steady state optimization software, the cost described above might be augmented by the sum of the squares of the differences between the simulated pressures at mileposts and the target pressures at the corresponding mileposts plus the similar sum of the squares of the velocity differences at such points. An example of how this cost may be calculated is provided below.

If the target state is steady for a final time period before T, the cost might be augmented by the sum of the squares of changes in pressure and velocity at mileposts over the steady-time period. While in neither case are these costs in the sense of dollars spent, they are costs in the sense that if they are significant, the optimizing process did not achieve the required target state. Similarly, costs can include a quantification of approaching to constraint limits, such as adding in the square of excess pressure over a constraint upper limit or the square of the deficiency in pressure under a constrained lower limit.

In the embodiment where the target state is computed internally, the cost functional will include costs for changes in the simulated pipeline state during the final portion of time interval T. Specifically let α be a suitable number between 0 and 1, e.g. 0.9. Then, for the simulated time between αT and T, there will be a cost added to the functional for each change in any state variable (pressure or velocity) from its previous value in simulated time. Recall, the state variables may be considered as the pressures and velocities at the predefined set of points, e.g. mileposts. The resulting steady period at the end of transition time (T) will assure the final state is sustainable, and thus, solve the inventory problem. An equivalent way of looking at this is that the time derivative of both the controls and the inventory are forced to be zero during the final portion of the time interval. Since the inventory remains stable despite unchanging controls, the end result is a sustainable state.

In step 212, the derivatives of the costs are evaluated using the initial state and model database 204, the forecast loads 206, the target state 208 and the control set 210. The steps involved in evaluating the derivatives of the costs are described in greater detail below with regard to FIG. 3.

The costs and derivatives are then iteratively evaluated in step 214 and the iterations are used to update the control set 210 in step 216. The steps involved in iteratively evaluating the costs and derivatives are described in greater detail below with regard to FIG. 4. Upon each evaluation of cost in step 202 and derivatives in step 212 based upon the most recent updated control set, the resulting gradient and cost are tested to assure that the most recent control set change has lowered the cost. This testing is done as part of the accelerated iteration in step 214 and is shown explicitly as step 215. In step 215, if the most recent change adversely affected the cost, the change is rejected. A rejection of the change usually occurs because the change in the control set in the predicted direction had been too large. In that case, the magnitude of the change is reduced, and control is returned to step 202. After the control set change is accepted in step 215, then the control set 210 is updated in step 216. Then the control set 210 is evaluated in step 218 to determine if it is an optimal control set as defined below. If the control set 210 is determined to be an optimal control set, then in step 220 the control set 210 is then sent to the CDAS 116 for implementation on the compressors and/or regulators 108 or is sent to the predictive simulation system 126 for simulation modeling. However, if the control set 210 is not optimal, then the process returns to step 202 and the process of determining the optimal control set is repeated.

A control set is said to be optimal if the gradient, evaluated as described below, is less in magnitude (norm) than a prescribed small limit. In essence, when the gradient is sufficiently small the physical interpretation is that a small change in the control set will not improve (lessen) the cost, so the best set possible has been found.

Figure 3:
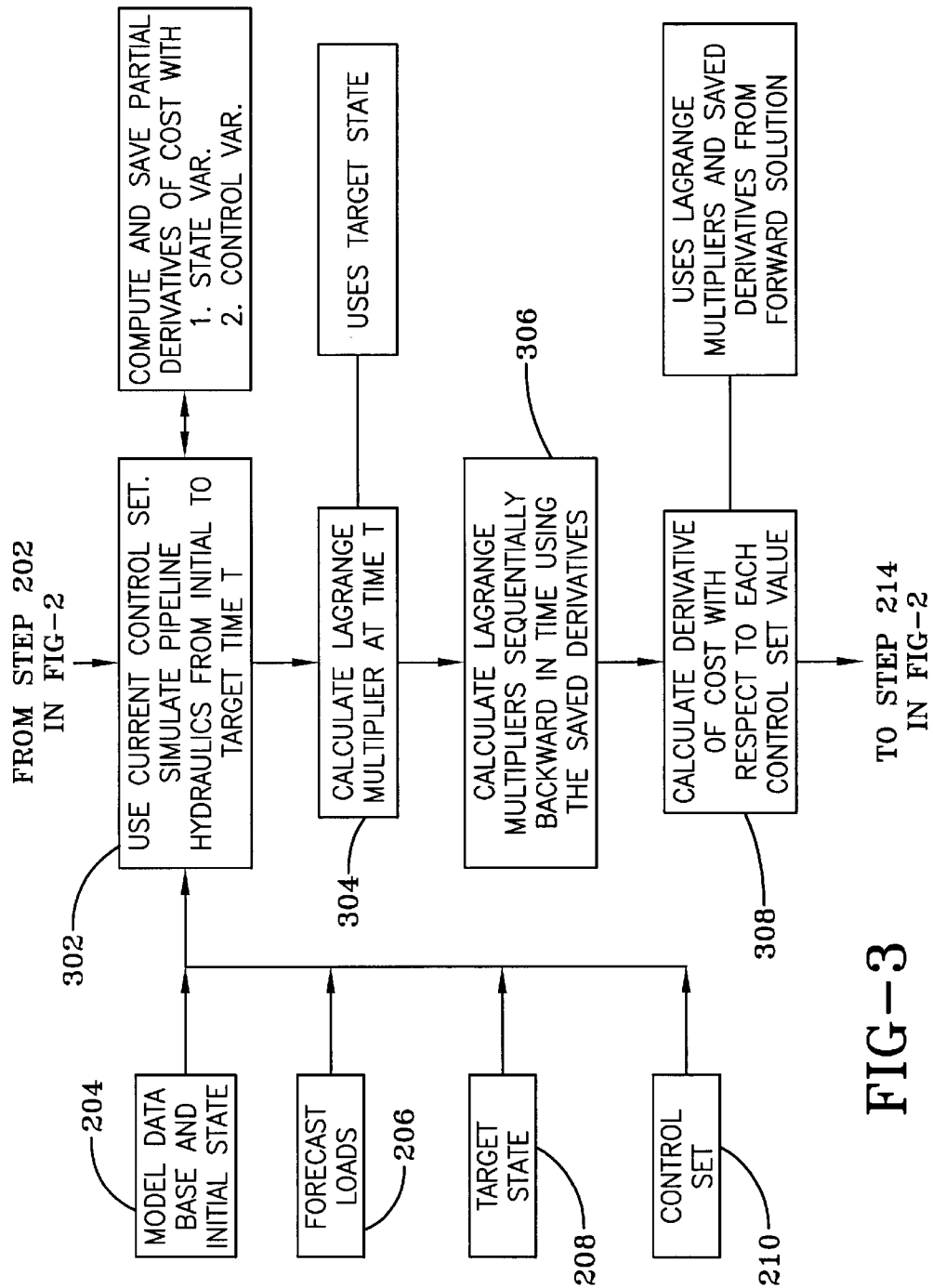
FIG. 3 is a flow chart that illustrates in detail the steps involved in evaluating the derivatives step of FIG. 2.

FIG. 3 illustrates in detail the steps preferably used for evaluating derivatives in step 212 of FIG. 2. In step 302, a simulation or prediction of the hydraulic performance of the pipeline system 100 over the transition time (T) is computed starting with the initial state and the current control set 210. This simulation or prediction, in other words, computes or generates the states of the pipeline system 100 at a large number of closely spaced intermediate times between the initial time (time 0) and the end of the transition time (time T). The simulation of the hydraulic behavior is accomplished by using any viable commercial hydraulic simulator. The commercially available hydraulic simulators can use a variety of different techniques or technologies to obtain substantially same results. Two major classes of simulation technologies are based upon 1) implicit methods and 2) the method of characteristics. In a preferred embodiment of the present invention, the simulation software used is based upon implicit methods simulation technology.

The simulation of the control set 210 permits the calculation and accumulation over time of the power usage, fuel or other costs (as defined above) during the transition time (T). Thus, given a control set 210, cost can be computed and integrated during the transition time (T). In one embodiment of the present invention, the initial state of the pipeline system 100 at time 0 and the initial control set 210 are used to simulate what the pipeline system 100 would do if the initial control set 210 was utilized. The numbers representing the initial state of the pipeline system 100 are multiplied by a matrix to determine the simulated state of the pipeline system at time t, i.e. the gas pressure and velocity at every point for time t. The matrix is a set of numbers and matrix multiplication is a set of rules for combining initial state values. The matrix and rules yield a state at time t that closely approximates what the actual state of the pipeline system 100 would be at time t using the control set 210. The simulation then proceeds by computing a new matrix for combining the simulated state numbers at time t to yield new state numbers at time 2 t. The sequence of stepping by t is repeated until the simulation reaches the transition time (T). In a preferred embodiment, the sequence of time steps used in the simulation, i.e. the ts, will not all be equal, but can be of varying lengths appropriate to maintaining accuracy in the simulation.

In addition to the simulation, derivatives of the cost functional with respect to the state variables (pressures and velocities at the computing knots) and control set values are computed and saved at every time level of the simulation. Preferably, the computing points or knots are closely spaced about one per mile of simulated pipeline and the time increments for the hydraulic simulation times can be on the order of T/2000, i.e. one-two-thousandth of the transition time T on average. The simulated time at any stage of the simulation is, of course, the sum of the possibly non-constant time steps taken to that stage. However, the computing points can be spaced at distances greater than or less than 1 mile and the time increments can be greater than or less than T/2000. In addition, step 302 uses forecast load information 206 in calculating the simulation and corresponding derivatives. When the simulation and derivative computation arrives at the end of the transition time (time T), the state variables should agree with those of the target state information 208. If they do not agree there is a cost increment associated with missing the target as described above.

The optimal control set is obtained by assigning a cost to the simulation results for a particular control set 210 and then choosing a succession of control sets that force the cost to be as small as possible. Costs are preferably assigned for missing the target pressure or gas velocity at each knot in the simulated pipeline. Then the total cost is calculated by summing up all of the corresponding costs. In one embodiment, the cost for missing the target pressure by ±1 psi can be equal to the square of the difference between the simulated and target pressures and the cost for missing the target velocity by ±1 ft/sec. can be equal to the square of the difference between the simulated and target velocities. Any cost that assigns an increasing value as the difference between the simulated and target values can be used for this determination. In the case where the simulated and target velocities or pressures were equal then the corresponding cost would be zero. For example, if in a 300 mile pipeline system with knots a mile apart and all of the simulated pressures deviate 1 psi in either direction from the target pressures and all the simulated velocities deviate 1 ft/sec. in either direction from the target velocities, the total cost would 300 (# of knots)* $1^2$ (cost for missing target pressure) +300 (# of knots)*$1^2$ (cost for missing target velocity) for a total cost of 600 units.

In another embodiment of the present invention, costs can also be assigned to using fuel. The simulation, as described above, can determine the amount of fuel that is used. A cost can then be assigned to each unit of fuel used during the transition time (T) and then the corresponding fuel cost can be added to the cost for missing the target state. Furthermore, a rapidly increasing cost can be assigned for approaching a constraint in the pipeline system 100. For example, a large cost could be assigned for exceeding the power available at a compressor and/or regulator station 108. Similarly, pressure values which approach the minimum or maximum values are also assigned a high cost, in addition to the cost for missing the target pressure. The sum of all the costs is called the functional or cost functional. Any valid control set 210 can uniquely determine a value for the functional. The valid control set with the minimum functional or cost would be an optimal control set.

To obtain the optimal control set, we use an iterative procedure that makes use of first and second derivative information of the cost functional with respect to the control set variables. It is customary to refer to this information as the "gradient" and "Hessian" of the cost functional, respectively.

The gradient (g) is a set of numbers proportional to the rate of change of the cost functional with respect to a unit change of each of the numbers of the control set 210. That is, g is a vector containing the first derivative of the cost functional with respect to each of the variables in the control set. The vector g will have the same number of entries as are in the control set. Similarly, the Hessian is a matrix of second order partial derivatives. If N is the number of values to be determined in the control set, $\{X_i\}_{i=1, \ldots, N}$, then the Hessian is an N by N square matrix whose elements are indexed by $i=1, \ldots, N, j=1, \ldots, N$, where i is the row index, j the column index. Then if J is the cost, which of course depends uniquely on $\{X_i\}_{i=1, \ldots, N}$, then the (i,j)-element of the Hessian matrix is given by $$\frac{\partial^2 J}{\partial x_i \partial x_j}.$$

This iterative procedure will successively simulate the system for different values of the control set and improve the control set values based on the results. Each time a control set 210 is used to carry a out simulation over transition time (T), the derivative of the cost functional with respect to each state variable is computed. In one embodiment, the power used at one compressor and/or regulator 108 can depend on the flow through the compressor and/or regulator 108, the absolute pressure, and the compression ratio. The compression ratio is the ratio of the discharge pressure expressed in absolute units to the suction pressure expressed in absolute units. Insofar as a change in power changes the cost and hence the cost functional, a change in any state variable corresponding to a compressor and/or regulator 108 may change the cost functional. The relation between the flow and compression ratios is quantifiable by generally accepted equations termed the "Horsepower-per-Million" Equations. These equations permit evaluating the derivative of power usage with respect to a change in any of the four state variables associated with a compressor and/or regulator station 108. The four state variables associated with a compressor and/or regulator station 108 are the suction pressure, the suction velocity, the discharge pressure and the discharge velocity.

Similarly, the pressure state variables throughout the simulation contribute to the cost of violating pressure constraints if the pressure at any point nears the constraint value at the corresponding location. This contribution to the functional is a differentiable function of the pressure at points where its contribution is not zero.

As the simulation progresses over the transition time (T), all the foregoing derivatives are computed and saved for each hydraulic time step as a forward solution. Similarly, all the aforementioned algebraic matrices used to move the simulation forward for each time step are saved. The latter matrices can be related to the collection of numbers by which state variables at a particular time are multiplied and combined to yield the state variables at the next time level of the simulation. The underlying matrices are equivalent numerically to the derivatives with respect to the state variables of the algebraic operator which transforms the state variables at time t to the state variables at time t+ t. Similarly, the derivatives of the algebraic operator with respect to the control variables are computed and saved in addition to the matrix operators used for the transformation associated with the simulation.

In step 304, the cost of the difference between the computed state and the target state (whether explicitly given or defined by the steady-target-state condition), the cost increment, is combined with information from the simulation to generate a vector called the LaGrange Multiplier corresponding to time T. The LaGrange Multiplier is a vector with the same number of elements as the number of state variables in the pipeline 104. The latter number is twice the number of computing knots as defined above. The LaGrange Multiplier contains information on how the derivatives of cost with respect to state variables translates back to the changes in the control variables. In step 306, an Adjoint technique is used to compute a sequence of LaGrange Multipliers backward in time from time T to time 0. The Adjoint technique permits derivatives to be evaluated substantially faster than by the direct evaluation of derivative. In practice, the Adjoint technique for evaluating the gradient requires hundreds to thousands of times less computation than direct evaluation of the derivatives by the finite difference quotient. The Adjoint technique is one factor that permits the control set optimizer 124 to generate an optimal control set faster than real time. Each backwardly calculated LaGrange Multiplier depends upon its counterpart at a later time. In step 308, all the LaGrange Multipliers computed in step 306 are combined in an algebraic step to form the gradient. This process of using the sequence of LaGrange Multipliers to evaluate the gradient in a subsequent algebraic step is referred to as solving the Adjoint Equation. Some of the saved derivative information is used to produce the entire set of derivatives of the cost functional with respect to each value in the control set as a single matrix multiplication. The one-step evaluation of all the derivatives with respect to each value in the control set in one algebraic operation (the adjoint solution) can produce a rapid evaluation of derivatives. In an alternative embodiment, the Adjoint step 306 can also be used to compute the second derivative information in specified directions should further computational acceleration be required.

Figure 4:
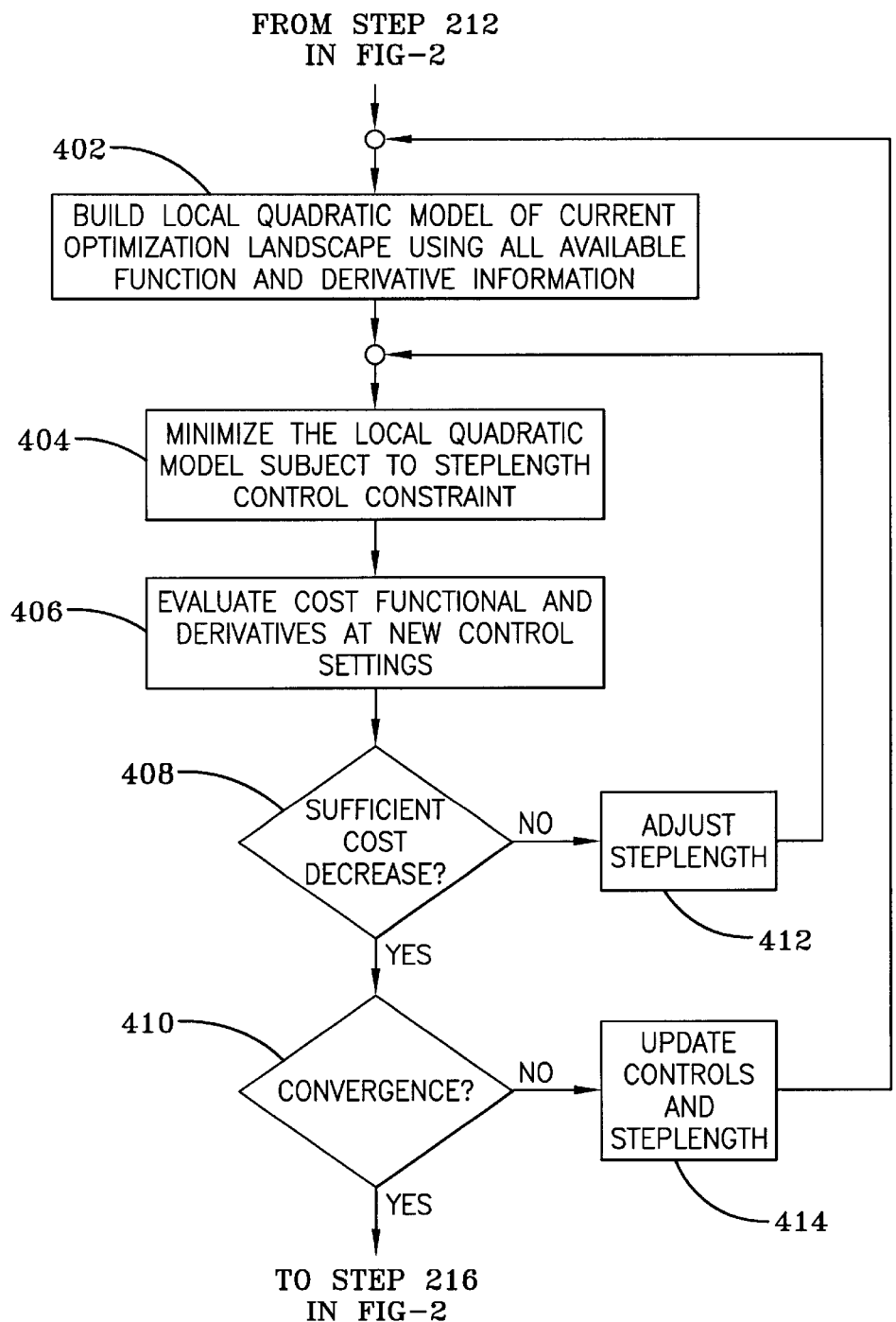
FIG. 4 is a flow chart that illustrates in detail the steps involved in the accelerated iteration step of FIG. 2.

FIG. 4 illustrates in detail the procedure for iterating costs and derivatives in step 214 of FIG. 2. The procedure for iteratively adjusting the controls to compute the optimal pipeline operation requires both first and second derivatives for rapid convergence. As previously discussed, the first derivative information for a given control set is computed using the Adjoint approach and is stored in a vector g known as the gradient. In step 402, an approximation is made of the second derivative information, i.e. the curvature of the problem, and then the second derivative approximations are stored in a matrix (B). In one embodiment for approximating the matrix (B), each component of the control can be perturbed separately and then reviewed for the subsequent change in the gradient. Dividing the change in the gradient by the perturbation size returns an approximation of one column of the matrix (B). Repeating this process will yield a finite-difference approximation to the matrix (B). Afterwards, the matrix (B) is forced to be symmetric. The finite-difference approximation technique can be used in conjunction with parallel computer processing, if desired.

In another embodiment of the present invention, a linear algebra solver can be used that works directly with second directional derivatives (the so-called Hessian-action approach) rather than storing the matrix (B) explicitly. Some common examples of these linear algebra solvers are the conjugate gradient, preconditioned conjugate gradient, conjugate residual and SOR.

In the preferred embodiment, the approximation of matrix (B) can be accomplished through a secant approximation of the Hessian matrix. Matrix B is approximated by evaluating changes in the gradient after simultaneous changes to several control variables at once. The matrix (B) is adjusted to match both the observed differences in the gradient and the perturbations that caused them. One advantage to this technique is that in any iterative optimization algorithm a new perturbation is already available once per iteration at no additional computation cost. Some examples of commonly used secant approximations are BFGS (also known as "the symmetric positive definite secant method"), SR1, DFP, PSB, any of the members of the Broyden Class, the limited-memory BFGS, and projected and optimally conditioned methods. In addition, if second derivative information was calculated in step 306, then the second derivative information can be included in the matrix.

In step 404, the matrix or quadratic model computed in step 402 having the first and second derivative information is minimized subject to a stabilization or globalization procedure for ensuring that the accelerated procedure will reliably converge. In a preferred embodiment, we use a Trust Region Method, and the modification step to the current iteration will be an Optimal Local Constrained step s satisfying:

$$(B+aI)s=-g \text{ and } \|g\|\leq b$$

where B is the second derivative matrix, s is the modification step, which is an N-element vector, the positive scalar b is the current steplength restriction (adjusted iteratively as the optimization proceeds), g is the gradient or first derivative vector (of N elements) and a is a non-negative computed scalar quantity. I is the N× N identity. Other possible embodiments of the invention could approximate this step using a dogleg, restricted subspace or other iterative method. Still another possible embodiment can perform a globalization using a Line search method where s satisfies:

$$aBs=-g$$

and α is a non-negative iteratively adjusted scalar quantity. The Line search method and the trust region method both damp the incremental change that can be made in any given iterative step. The Line search method simply shortens the steps, if necessary, while the trust region method can both shorten steps and rotate them through multidimensional space if needed to further enhance reliability.

In step 406, the control set 210 is tentatively updated by adding the step s and the performance of the updated control set is evaluated. In step 408, the updated control set is checked for a sufficient cost decrease. If the cost decrease is not adequate, the steplength restriction b is shortened in step 412 and the process returns to step 404 to ensure that the algorithm remains stable and converges. If the cost decrease is adequate, the updated control set is evaluated for convergence or completion in step 410 (convergence or completion here means the test of step 410 shows the optimality condition has been attained and no further iteration is required). If the updated control set has not converged, meaning it is non-optimal, the current control set is replaced by the updated control set, the current steplength is updated in step 414 and processing returns to step 402 for further improvement.

While the present invention has been described in terms related to gas pipelines, it is to be understood that the present invention can be equally applicable to any other type of pipeline system including oil pipelines and water pipelines.

Figure 5:
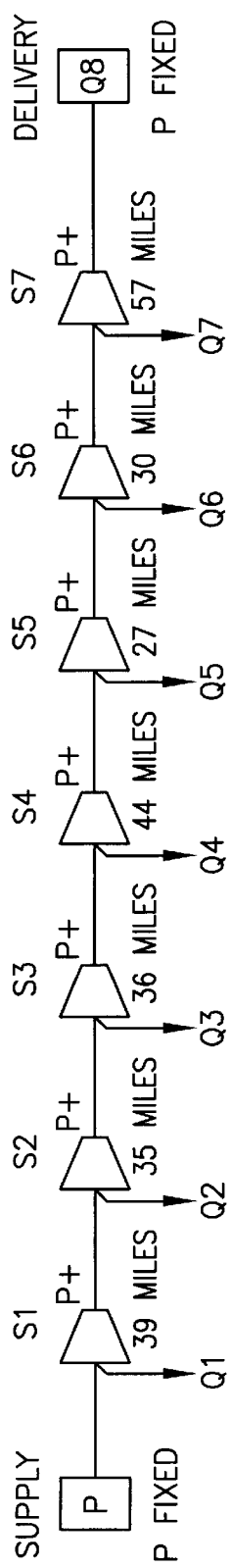
FIG. 5 is a schematic illustration of the pipeline system used for Examples 1–5.
Figure 6A:
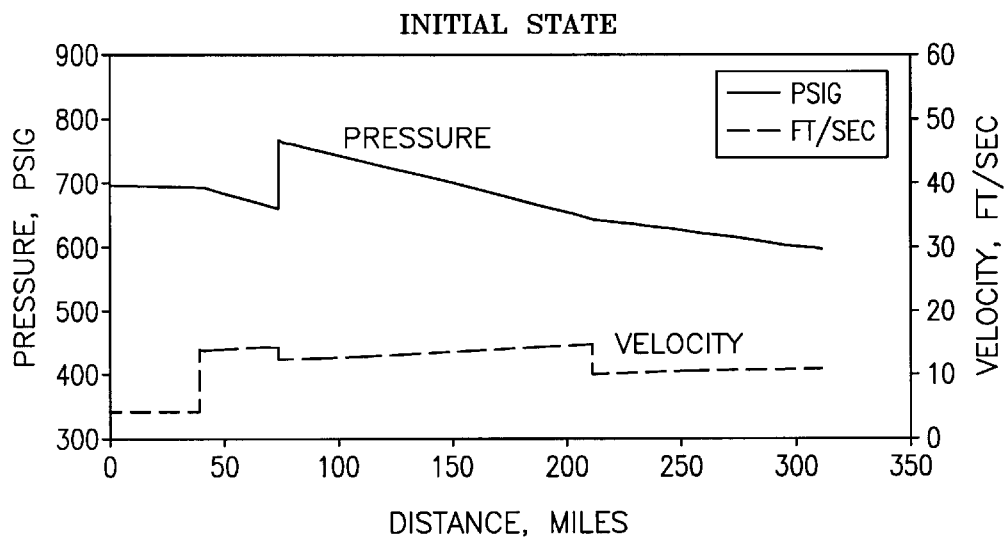
FIGS. 6–13 are graphs illustrating the initial conditions and simulated results for Examples 1–5.
Figure 6B:
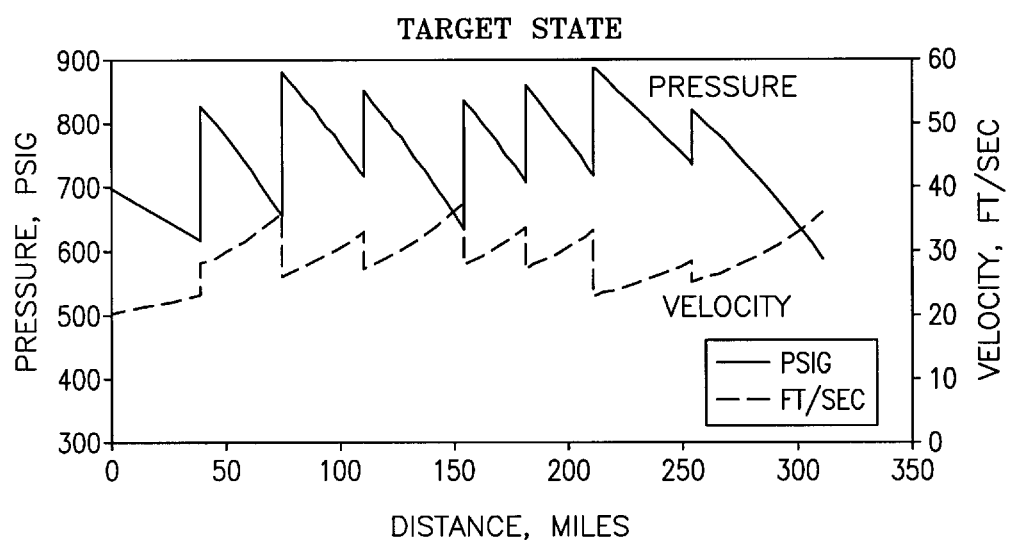
Figure 6C:
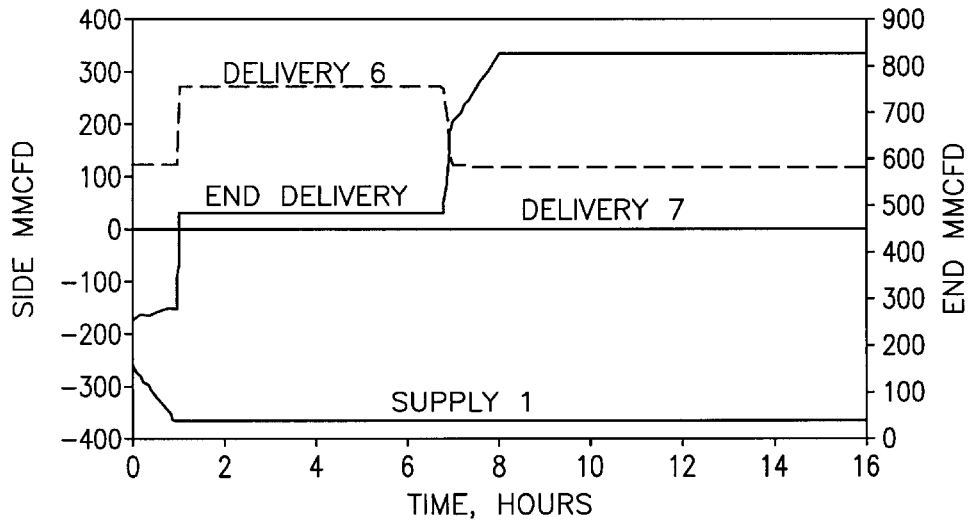
Figure 6D:
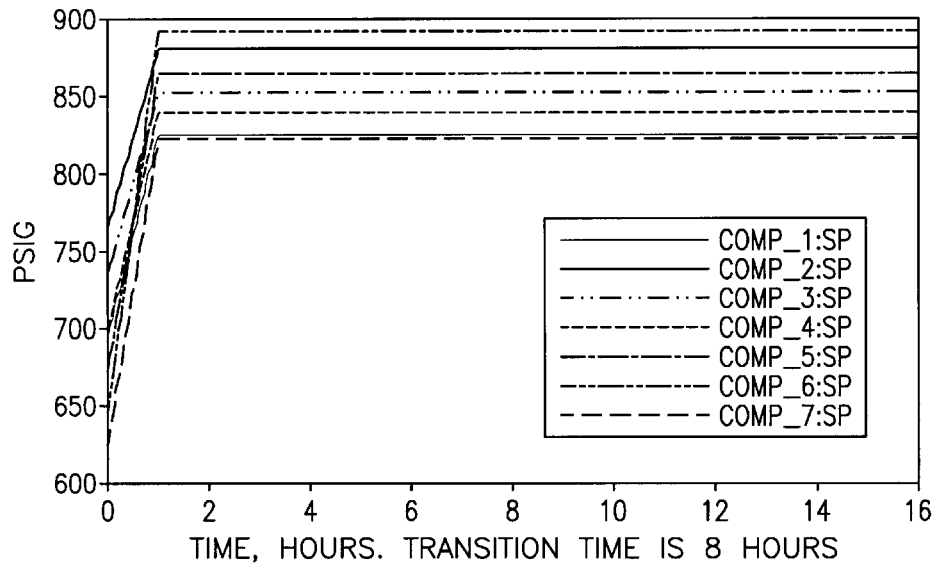
Figure 7A:
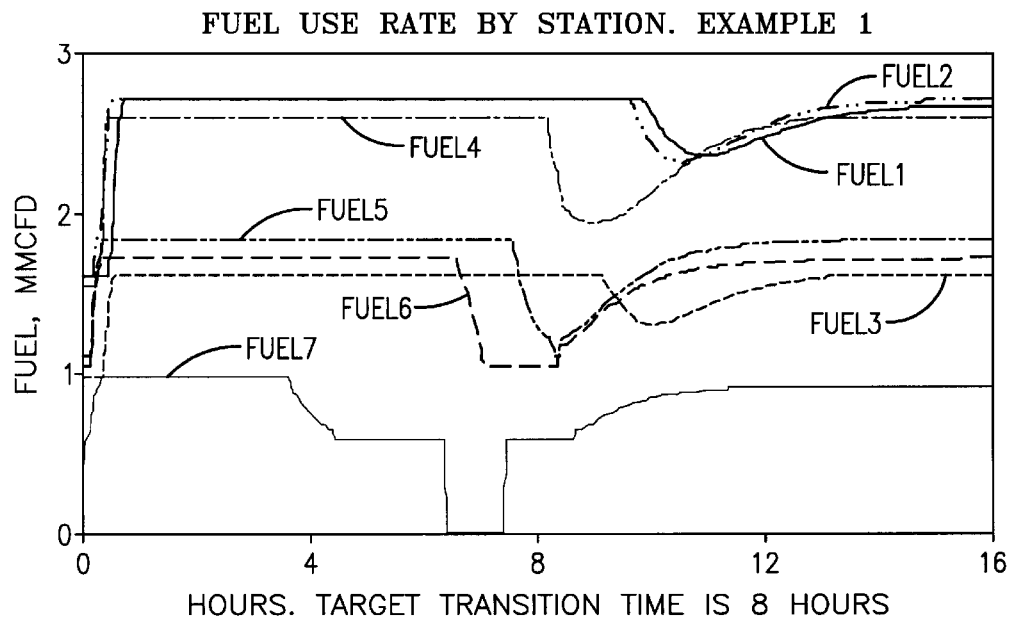
Figure 7B:
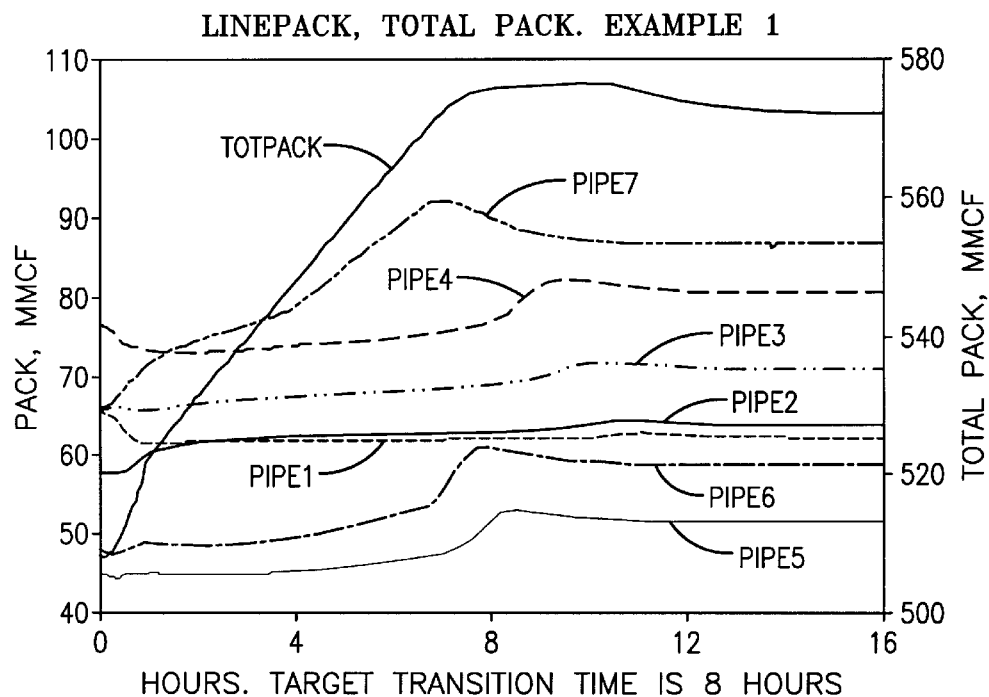
Figure 7C:
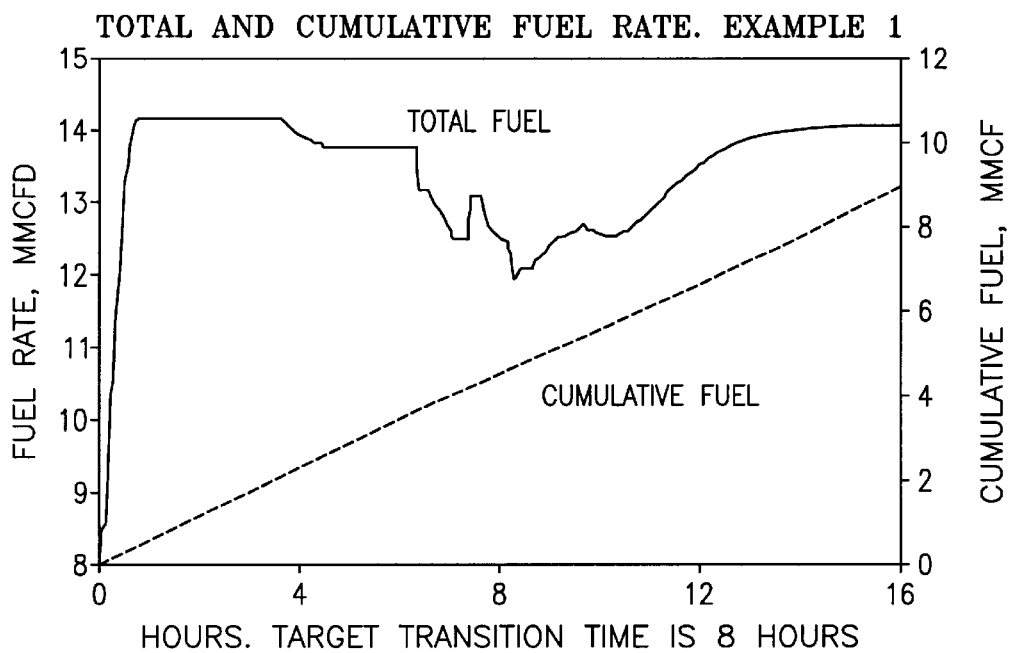
Figure 7D:
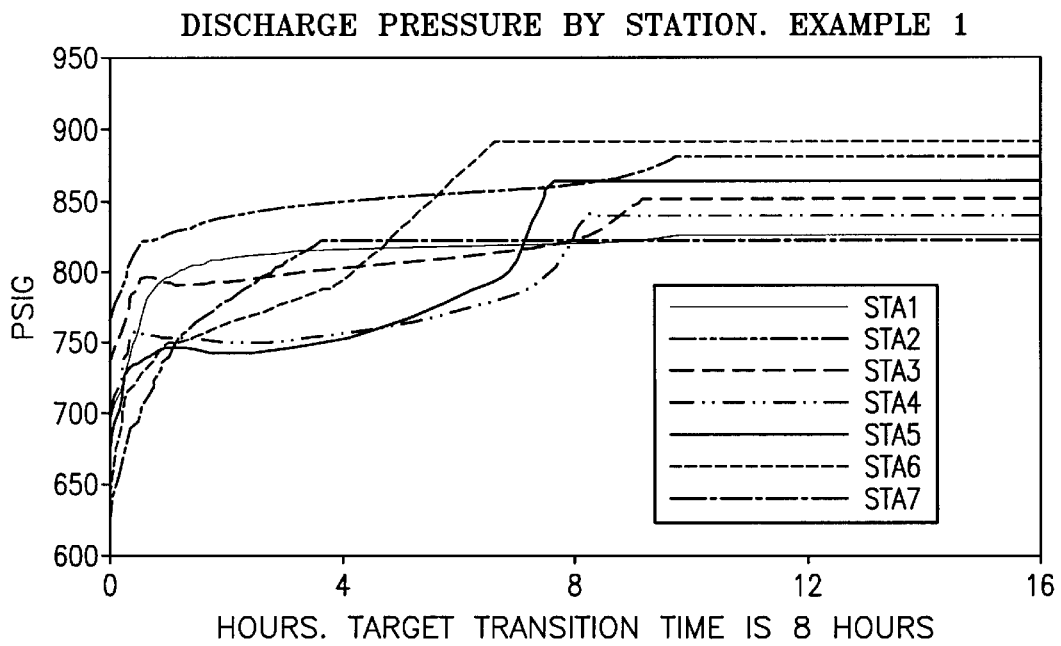
Figure 8A:
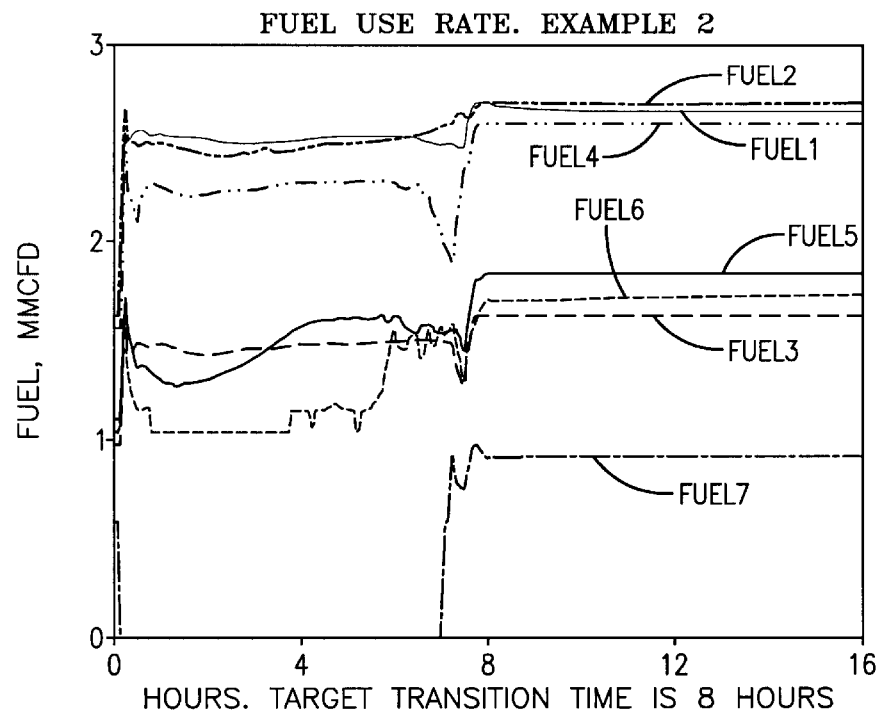
Figure 8B:
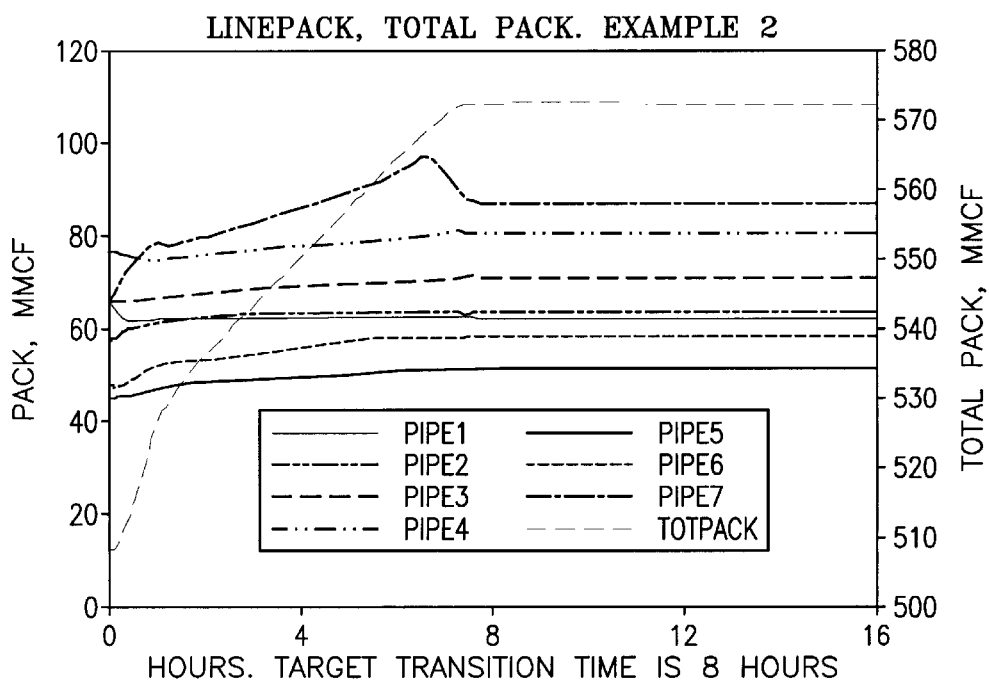
Figure 8C:
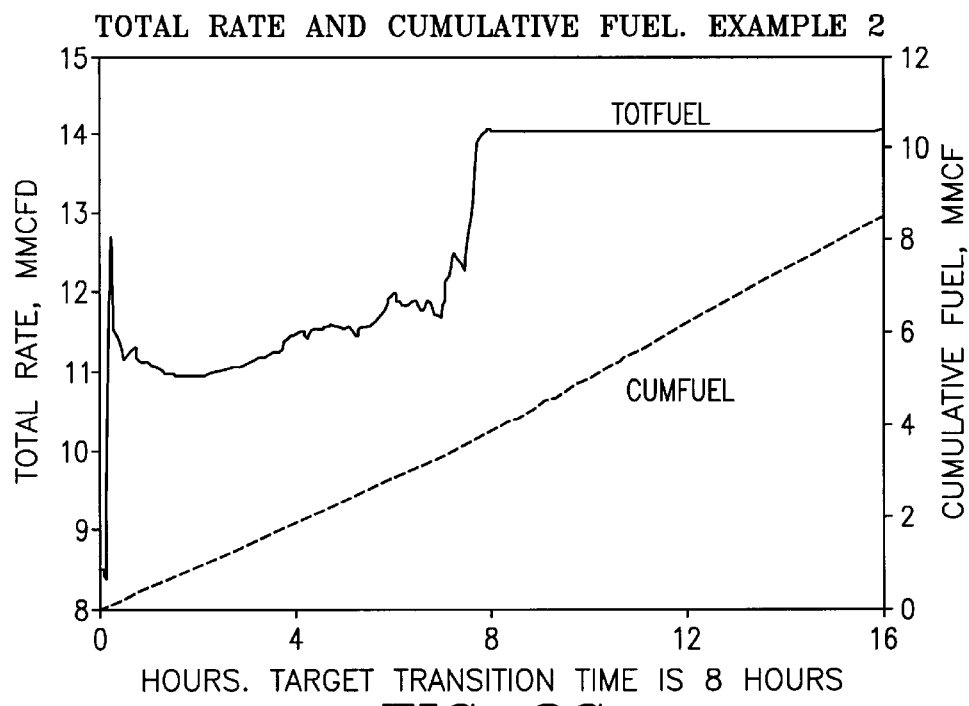
Figure 8D:
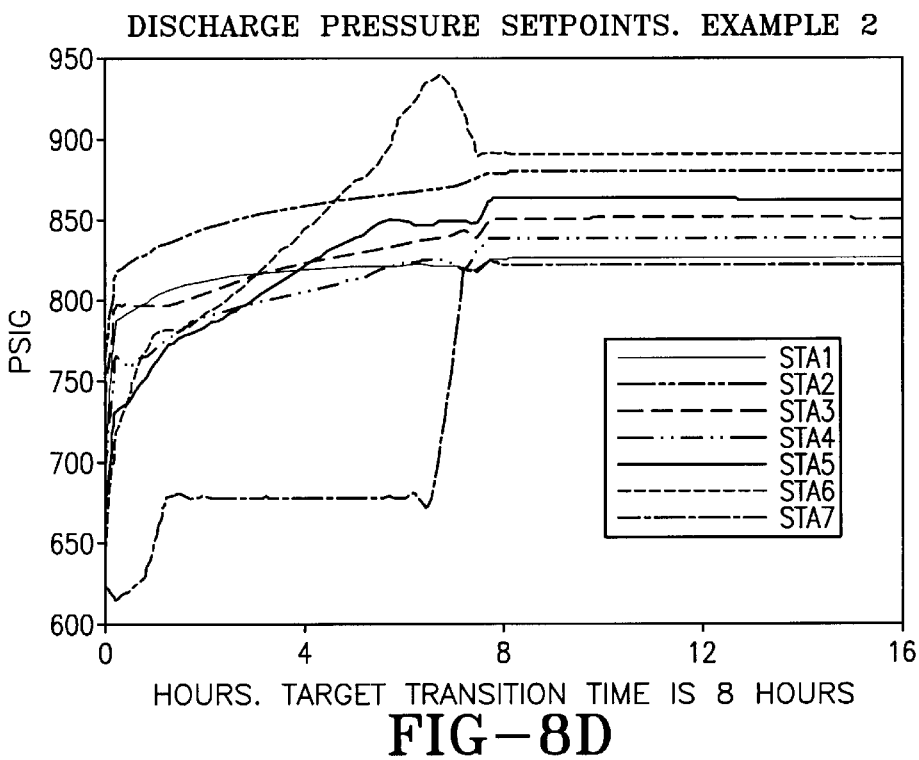
Figure 9A:
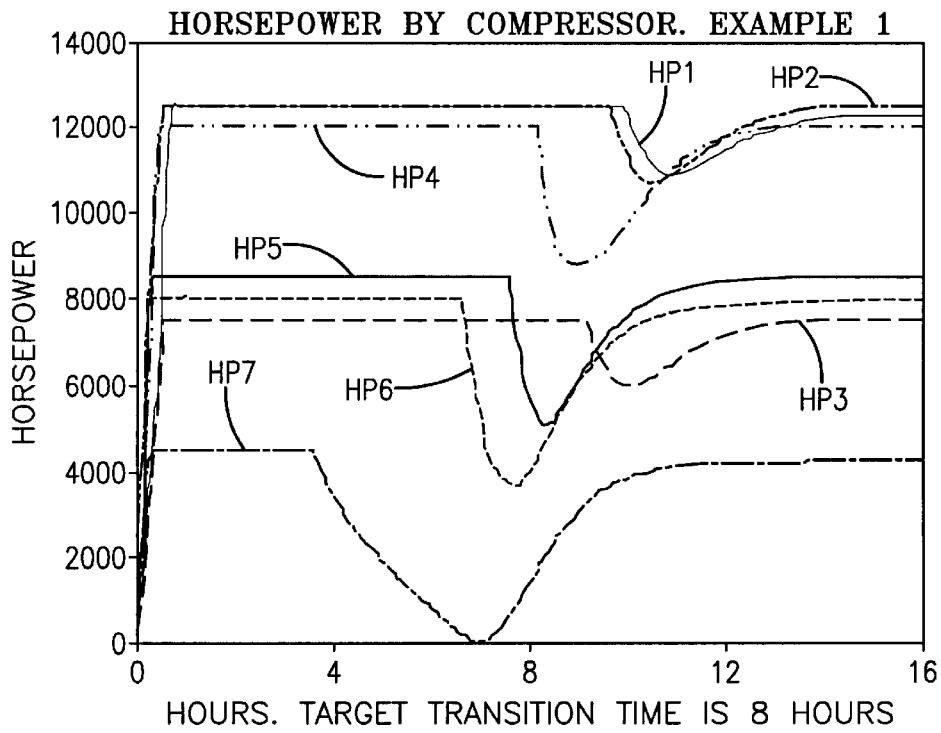
Figure 9B:
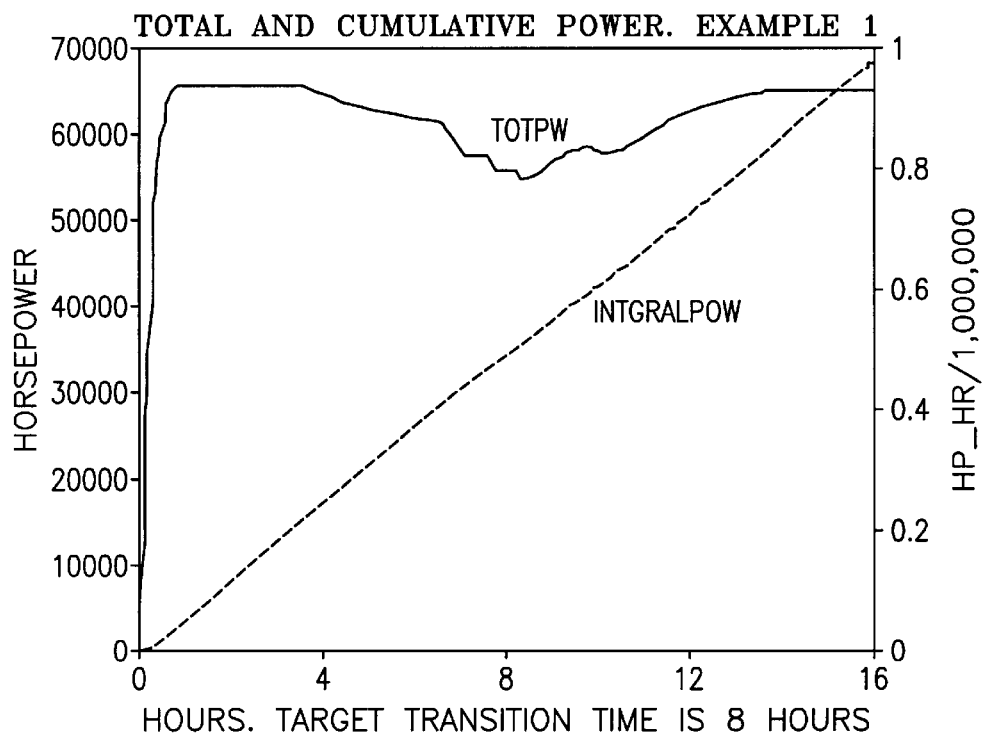
Figure 9C:
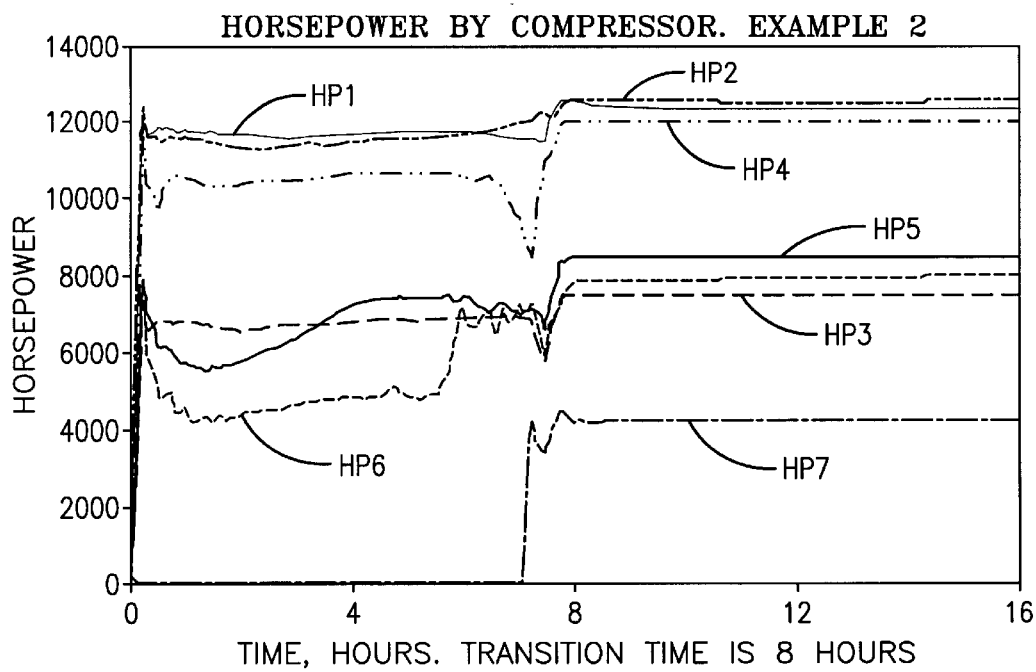
Figure 9D:
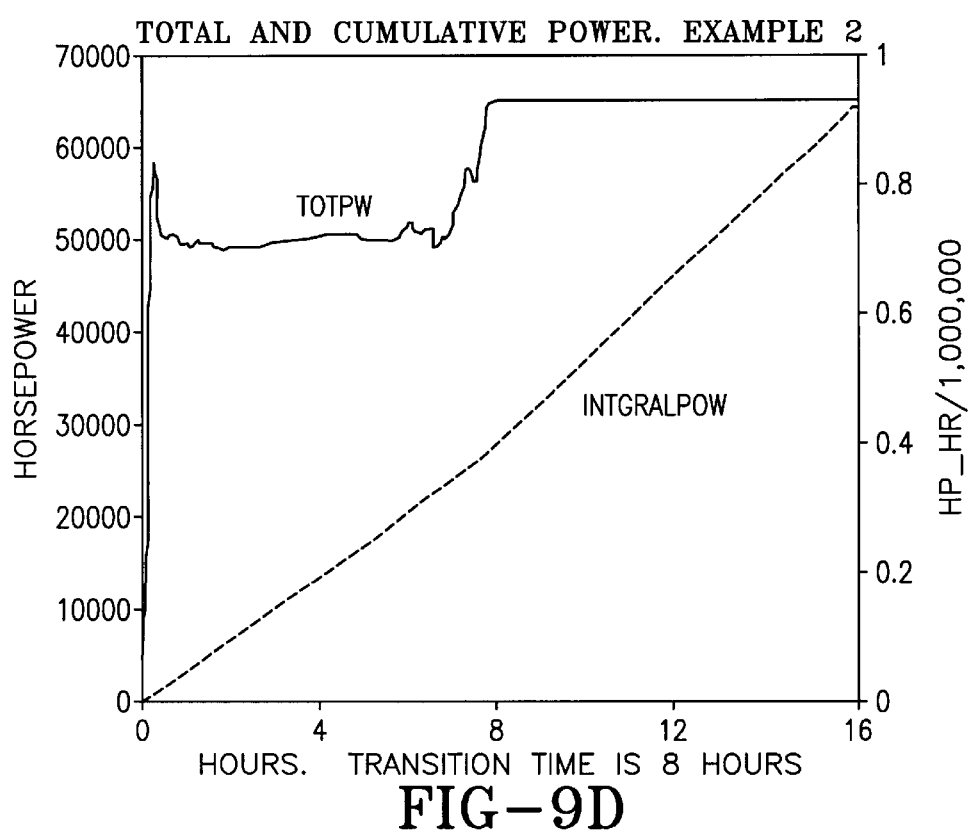
Figure 10A:
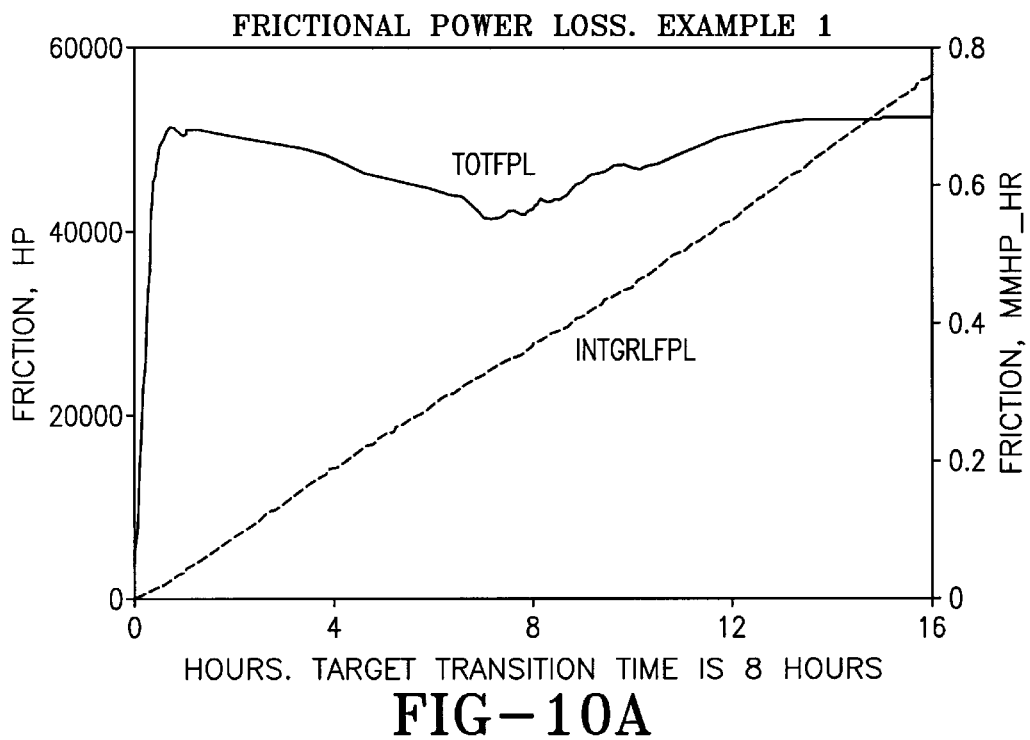
Figure 10B:
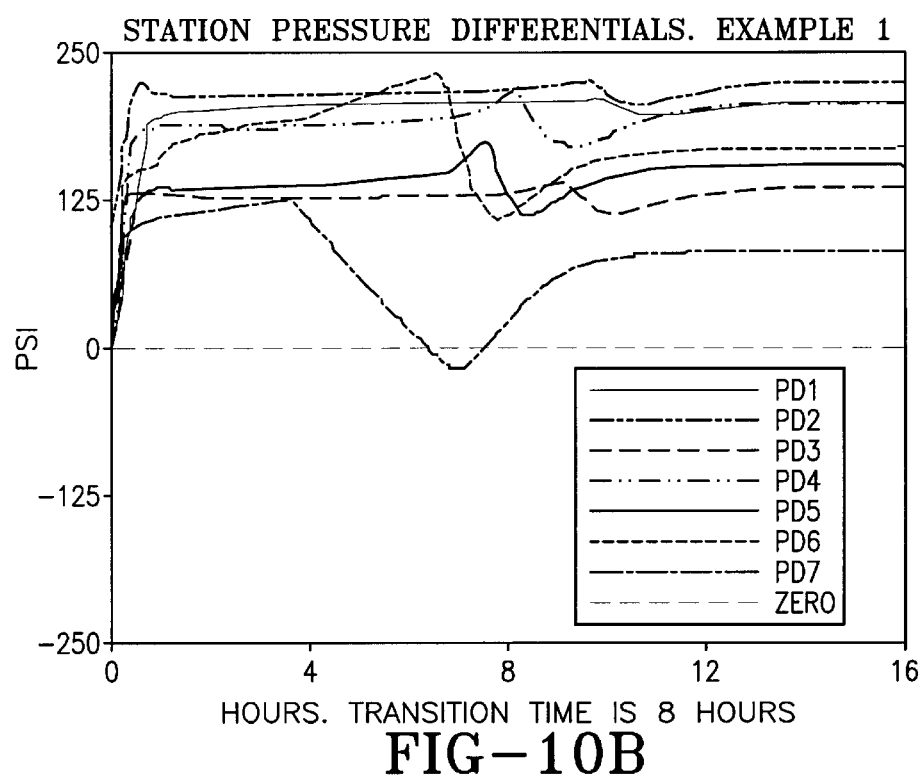
Figure 10C:
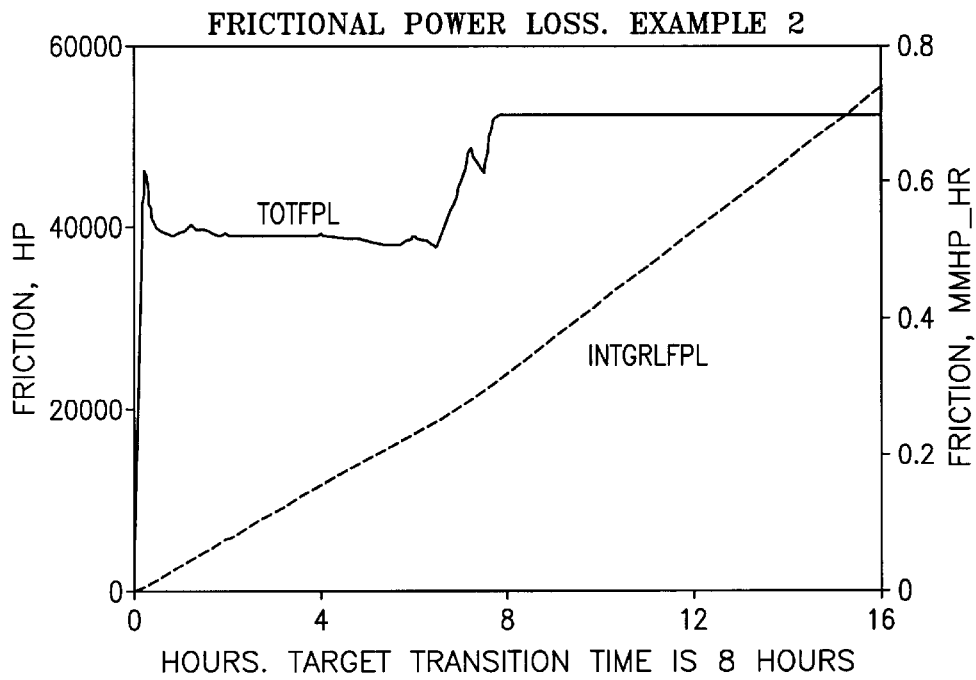
Figure 10D:
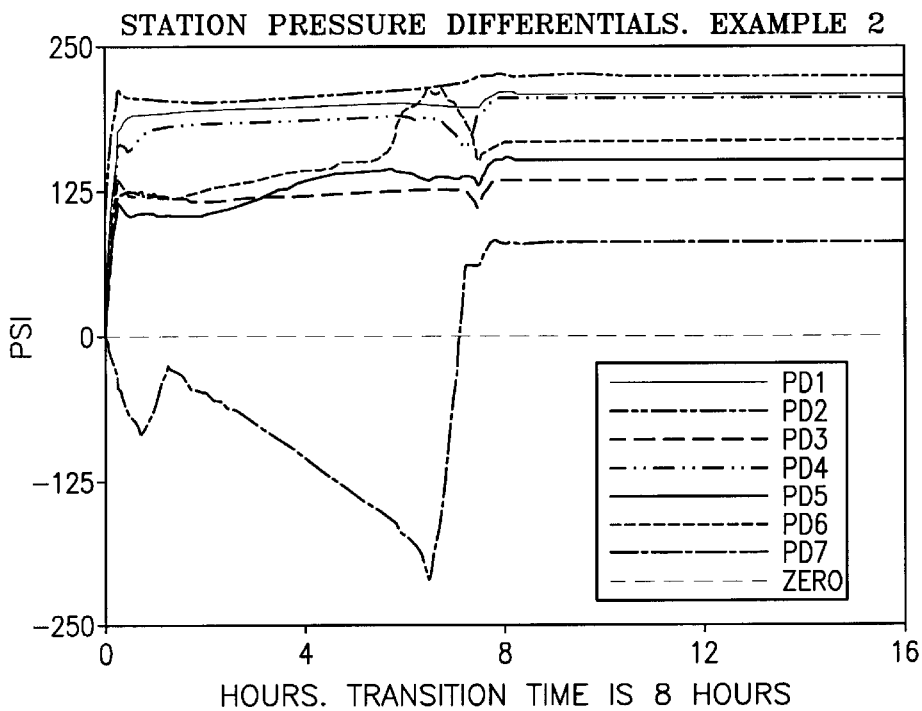
Figure 11A:
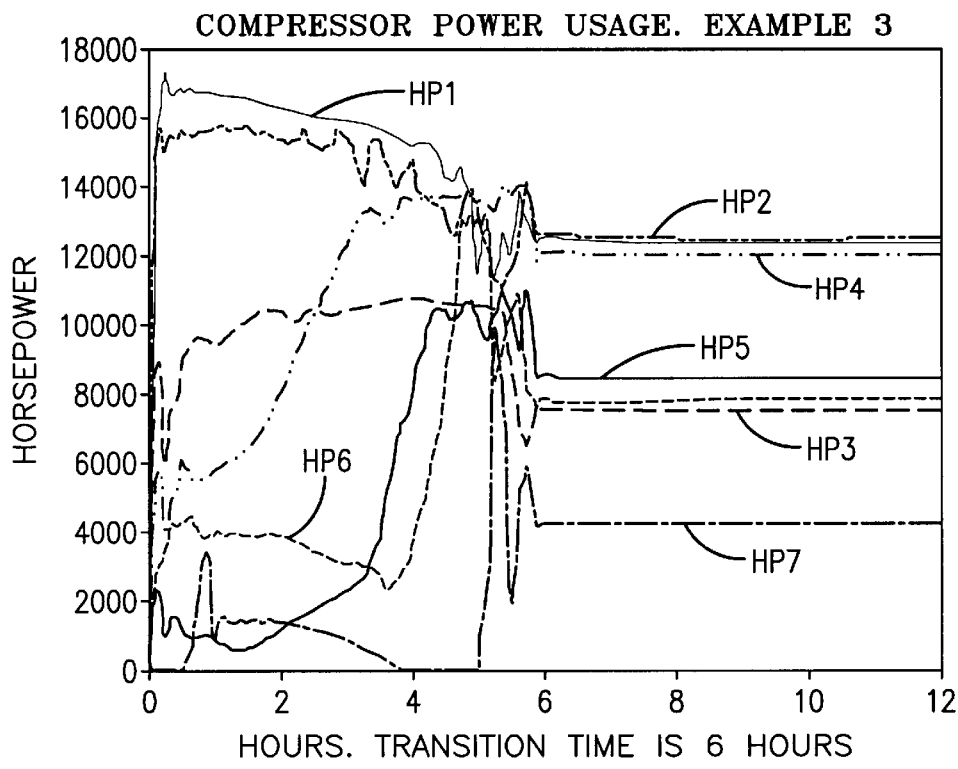
Figure 11B:
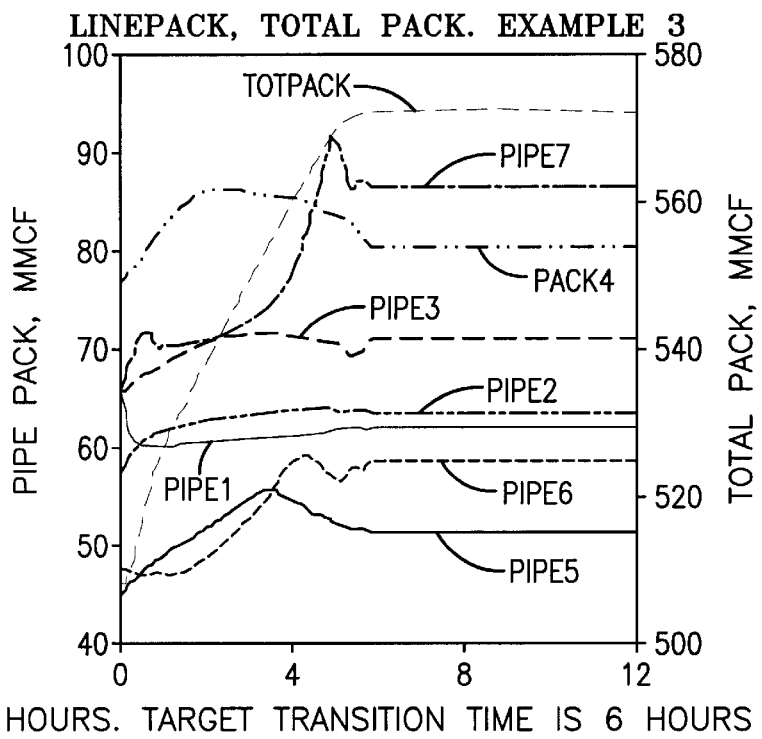
Figure 11C:
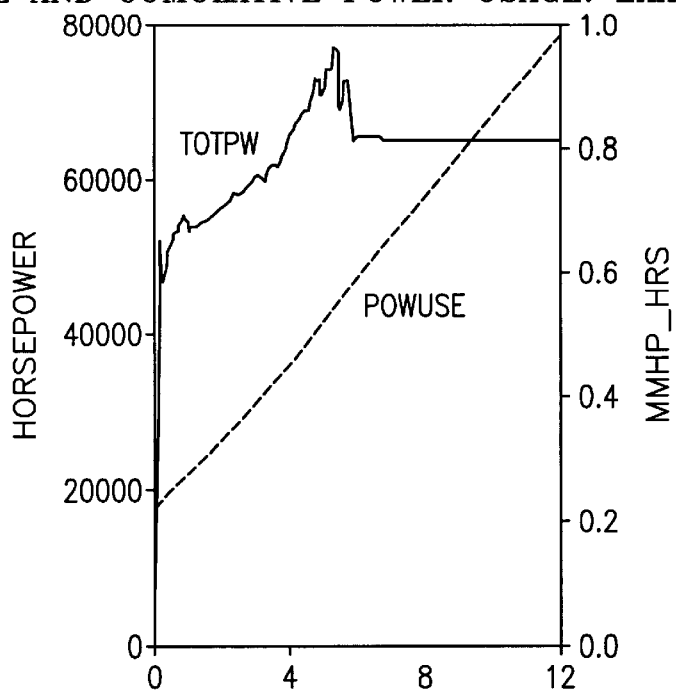
Figure 11D:
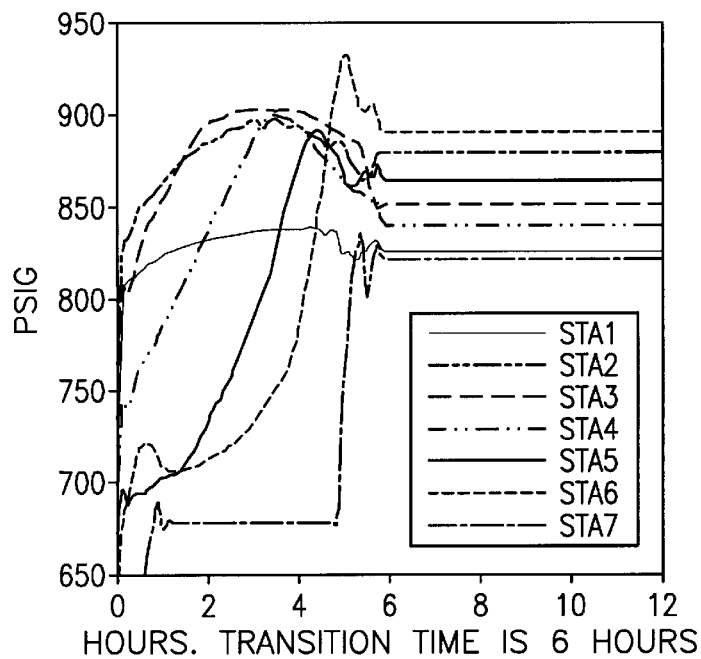
Figure 12A:
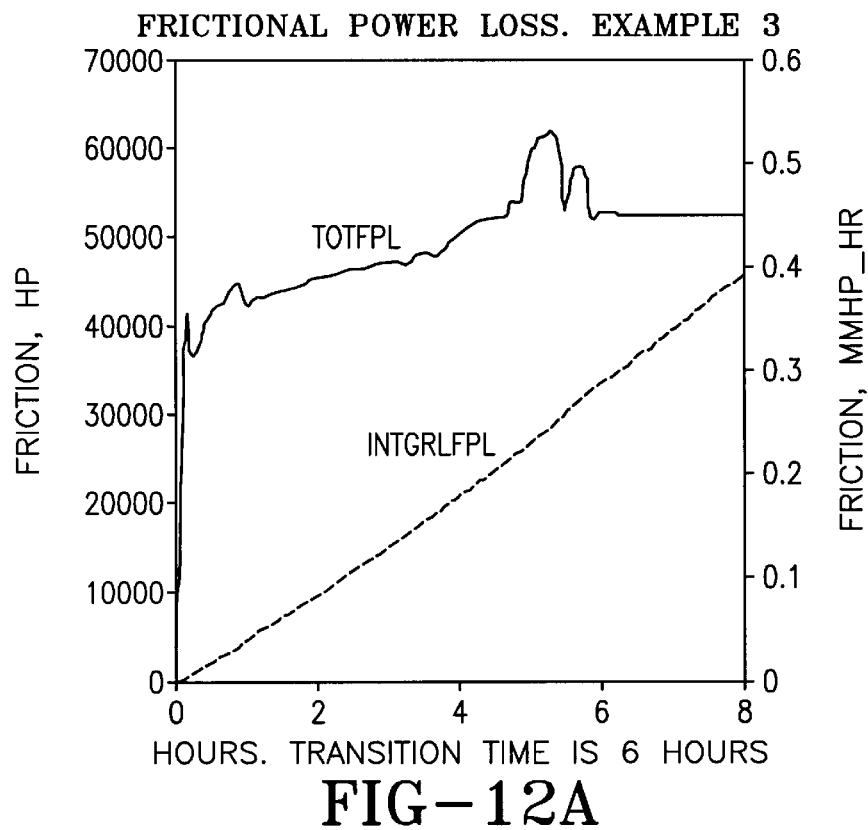
Figure 12B:
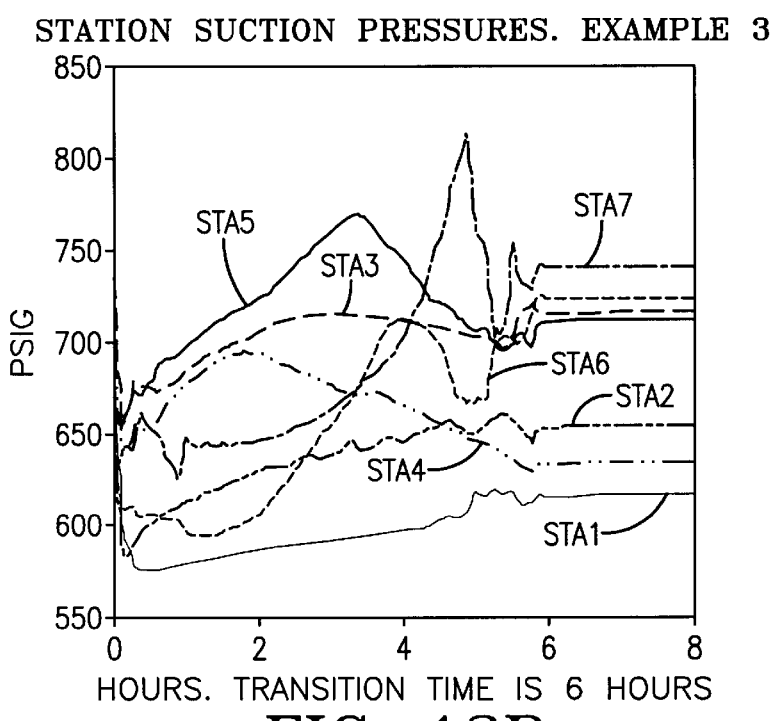
Figure 12C:
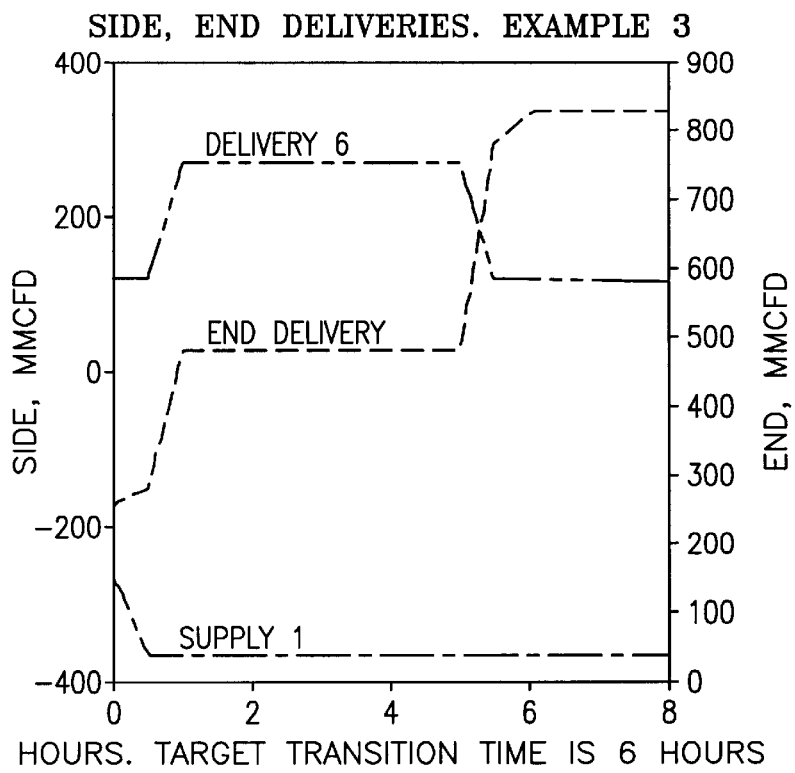
Figure 12D:
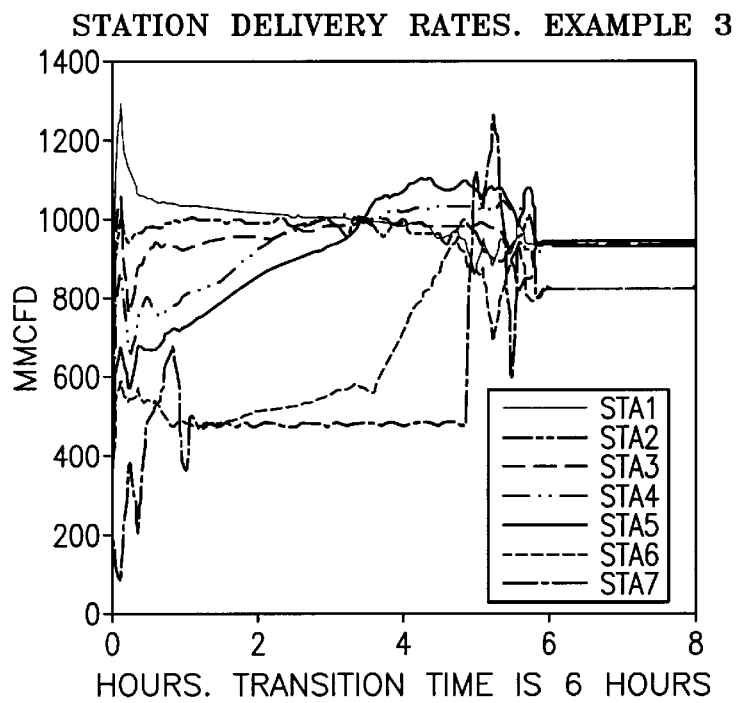
Figure 13A:
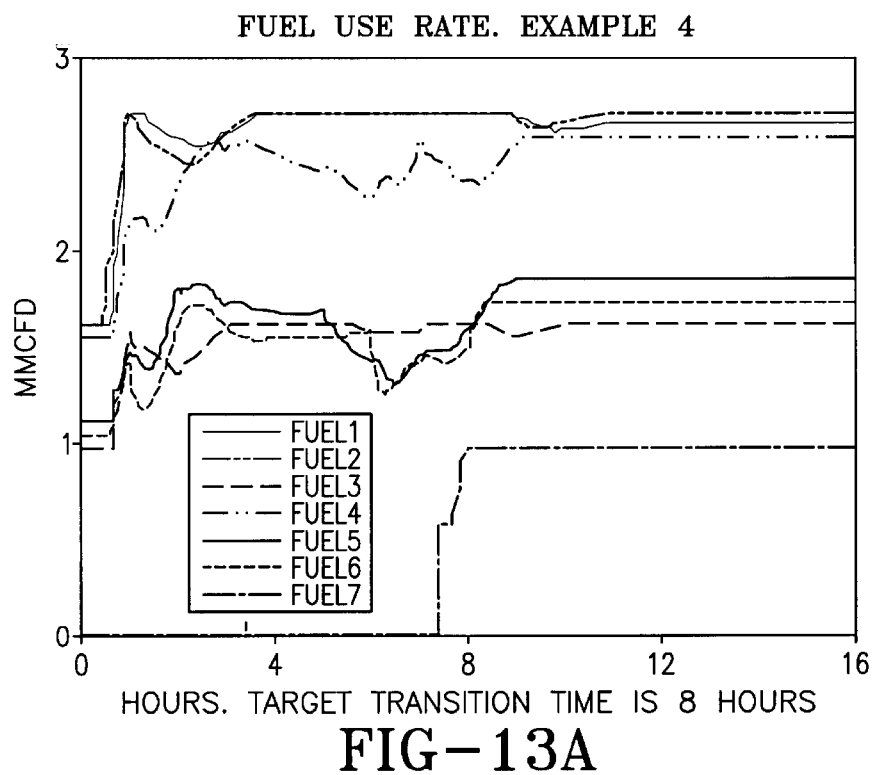
Figure 13B:
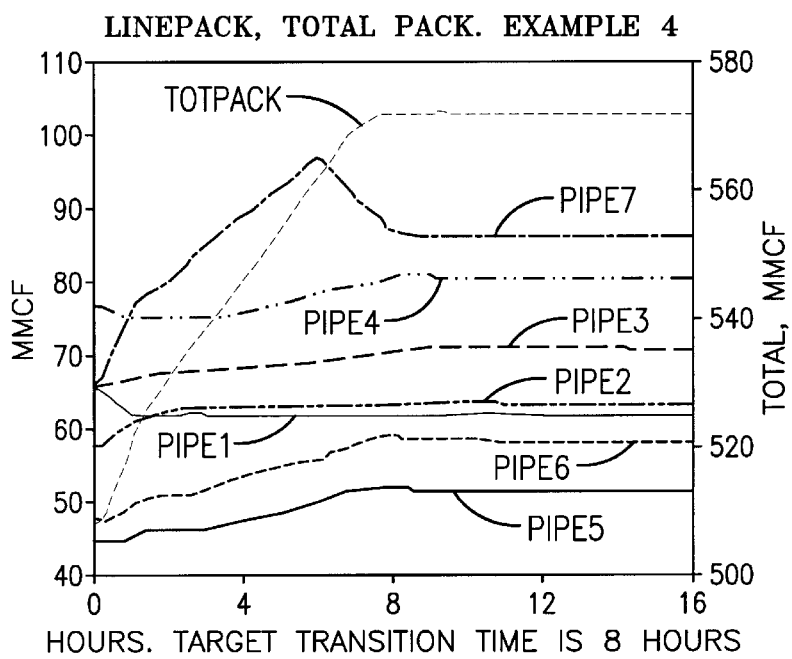
Figure 13C:
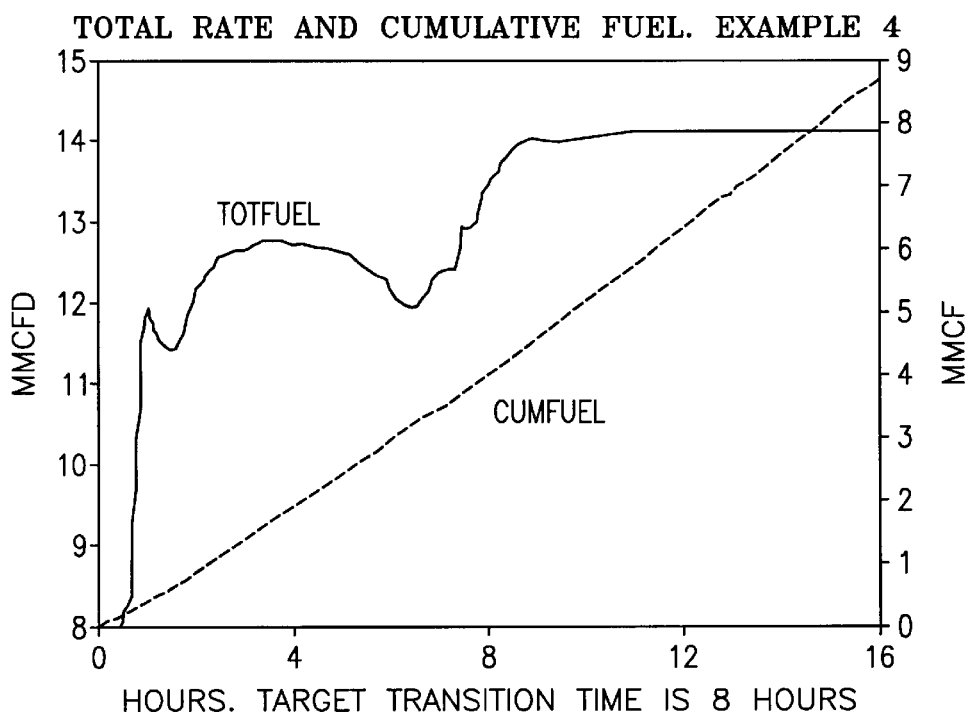
Figure 13D:
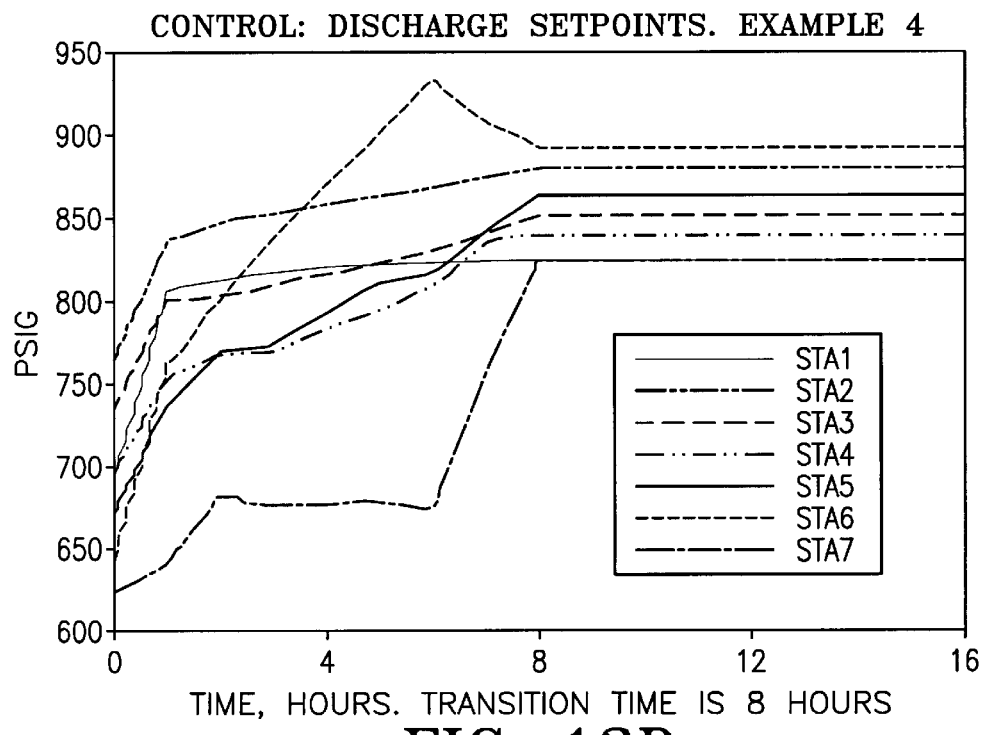

To further illustrate the operation of the present invention, the simulation of several different scenarios or situations of a representative pipeline system using the optimization techniques of the present invention are presented herein as examples. The representative pipeline system used for the simulations is illustrated schematically in FIG. 5 and represents the structure of a segment of an actual field piping system. The representative pipeline system is a gunbarrel pipeline system 311 miles long with seven compression or compressor stations S1–S7, a fixed pressure inlet and a fixed pressure delivery point. However, it is to be understood that the present invention is equally applicable to more complex pipeline systems including branched and looped ones.

In the representative pipeline system used for the simulations, the pipe has a 33–3/16 inch inside diameter throughout the entire pipeline system. The maximum available theoretical power at the compression stations S1–S7 is, respectively, 12500, 12500, 7500, 12000, 8500, 8000, and 4500 HP. In the following simulated examples, and unlike the actual field system, the elevation was taken to be zero throughout the entire pipeline system. The setting of the elevation to zero facilitates the interpretation of the distribution of power utilization in the results. Additionally, at the inlet of each of the compressor stations S1–S7 and at the final delivery point, additional pipeline delivery or receipt points are indicated by Q1–Q8. Finally, at each of the compression stations S1–S7 a station discharge pressure P+ is used as the time-dependent control value to be determined in the following examples. However, it is not a requirement that the compression stations are controlled by discharge pressure. Any controllable hydraulic quantity at each station that results in a hydraulic system uniquely determined for each time between 0 and T by the values of the control set can be used.

Delivery or receipt of gas at time-varying rates can be specified for any compression station S1–S7 at its suction or inlet side Q1–Q7 during the transition time, T. However, it is not a requirement that all time-dependent deliveries and receipts occur at compression station inlets Q1–Q7. The initial state of the pipeline system is defined by pressures and velocities given by data along all the computing knots in each pipe. In the following simulated examples, the knots of the pipeline are defined by data at 1-mile spacings. The target state of the pipeline system is steady and similarly defined by data. The transition time T is also input as data.

FIG. 6 illustrates in the upper two panels of the figure, the initial and target states, respectively, of the piping system used for the simulations. Each state is shown as the pressure (in psig, on the left axis) and velocity (in ft/sec, on the right axis) as functions of length along the 8 pipe segments which comprise the 311-mile structural gunbarrel shown in FIG. 5. These initial and target states shown in FIG. 6 are used for all the simulated examples.

All the simulated examples described below will consider the transition between a low-flow state with only compressor station S1 in operation (as illustrated in the upper left panel of FIG. 6) to a target-flow state characterized by near maximum throughput with all compressor stations S1–S7 running (as illustrated in the upper right panel of FIG. 6). Both the initial and final states were determined by commercial steady-state optimization software defining the setpoints for the compressor stations S1–S7 to accommodate the imposed flow for both the initial and target states. Specified receipts and deliveries within the system are also highly time-dependent during the examples.

The control set to be calculated is the set of discharge pressures P+ at each of the seven compression stations S1–S7 for a sequence of time values during time interval, T to transition from the initial state to the target state. In the following simulated examples, as we would expect in the actual field applications, the discharge pressure setpoint at each compressor station S1–S7 will be ramped linearly between the setpoint values corresponding to each of the time levels in the control set. In the first two examples, the time T is selected to be 8 hours, and the control values will be defined on 15 minute intervals for a total of 32 (8.0/0.25) values for each station. A feasible control set that minimizes cost, i.e., either of the cost of fuel or of power, is desired depending upon the particular scenario. A control set is called feasible if it does not violate any of the constraints of the pipeline system. For completeness, note additional constraints for all examples are: a maximum discharge pressure of 1000 psi, and a minimum pressure of 500 psi at all station suction/delivery points.

For the following examples, either fuel or power was used as the cost objective to be minimized. However, many other objective functions could be used or included as the cost to be minimized. For instance, the cost of fuel and/or power depending upon price changes during the day can be written into the cost objective if the electric rates change depending on the time-of-day. Also, emissions models for compressor usage relating to emissions of gases as restricted by law can be incorporated into the cost objective. As mentioned earlier another function or extension that can be used in the objective is the planning of curtailment that might become necessary due to loss of equipment or supply, or some other contingency. If the scheduled deliveries were not feasible with available resources, the cost of curtailing interruptible deliveries in the objective would allow an immediate response to unexpected contingencies. The solution of the resulting scenario would then automatically point to the time and locations at which curtailment will incur least cost, and provide the necessary control for achieving the minimum cost schedule. Applications involving the use of storage fields would also be a logical extension.

In another scenario, if the predicted loads fluctuate due to changes in weather forecasts or market conditions, the transient optimization technique of the present invention can be re-executed under the updated conditions to revise its previously computed control. However, because of the iterative nature of the solution process and the reuse of previous information, computing a revised solution will be substantially faster than the original computation—a significant advantage for large systems.

EXAMPLE 1

Pipeline Operation Without Optimization

Before considering the optimization technique of the present invention, the first scenario is presented as a comparison case and will be described independently from any optimized strategy. Example 1 generates a control set for the first scenario using a strategy much like an actual operator might choose if given the same task of transiting the pipeline from the initial to the target state. In Example 1, given the initial state and the steady target state, as shown in FIG. 6, all the discharge set points are quickly set to their target values in the target state, and the pipeline system allowed to settle to a steady state. However, to maintain feasibility the power limitations of the stations and the minimum/maximum pressure constraints must be observed.

A control set determined in this manner represents a reasonable strategy that may often be the one actually used in practice by pipeline system operators. As such, the simulated results from Example 1 represent a reasonable strategy to be the basis of a comparison with the results from the optimization technique of the present invention. However, this strategy provides no flexibility to take into consideration the transition period, T, which for this example is 8 hours. Thus, the results of the simulation of Example 1 depend solely upon the piping and compression system characteristics without any consideration of the time frame needed to obtain the resultant target state.

The lower left panel of FIG. 6 shows the deliveries and receipts at delivery/receipt points Q1–Q8 that are required during the 8-hour transition period applicable to Example 1 and to. Example 2 to be discussed in greater detail below. The lower left panel of FIG. 6 shows the side and end delivery rates. The side delivery rates are shown on the left axis and the end delivery rates are shown on the right axis. A positive value represents a delivery and a negative value represents a receipt. To illustrate, at compression station S1 there is a gas supply received into the pipeline system and at compression station S6 there is a changing delivery from the pipeline system. The delivery from the end of the pipeline system is shown on the right scale of the lower left panel of FIG. 6. The delivery increases in steps during the 8 hour transition period, the most recent change occurring at about a half-hour before the end of the transition period (T=8).

The right panel at the bottom of FIG. 6 shows graphically the control strategy for Example 1. The compressor station setpoints are simply linearly ramped from their initial values to their steady target values during the first hour, and time is allowed for the pipeline state to settle to the target steady state. The simulation imposes the maximum power constraints as necessary. As mentioned above, this control set or strategy might be how an operator would control the pipeline to achieve the desired steady state.

The results of the Example 1 simulation using the manual control set shown in the lower right panel of FIG. 6 are detailed in FIG. 7. The upper left panel of FIG. 7 shows the rate of fuel usage by compression station S1–S7 over a 16 hour operation period. The intent in this example was to be able to achieve the target steady state in a transition time of 8 hours. As discussed above, the manual control set does not address the transition time issue and thus the total transition time can vary in length. Using the manual control strategy the flow does not quite settle to the desired steady state in twice the desired time. Several other of the hydraulic consequences of the manual control set are noteworthy. The manual control set quickly moves the discharge pressure set points to their target values. However, the simulated discharge pressures do not track the discharge pressure set points because there is inadequate power available at the compressor stations S1–S7. As stated above, the maximum available theoretical power at compressor stations S1–S7 is, respectively, 12500, 12500, 7500, 12000, 8500, 8000, and 4500 HP. The manual control set of Example 1 quickly causes each of the compressor stations S1–S7 to be constrained by the available power so that the discharge pressures P+ at the compressor stations S1–S7 do not track the control set points. The discharge pressures P+ at the compressor stations S1–S7 are illustrated in the lower right panel of FIG. 7. With the manual control set not all the set points were achieved until almost 8 hours into the transition.

Another aspect of the simulation is the total fuel usage during the transition. The aggregate fuel used during the time interval plotted is shown in the lower left panel of FIG. 7. The left axis is the instantaneous fuel usage with time at all compressor stations S–S7, the plot labeled as TOTFUEL. The right axis is the integral in time of the instantaneous fuel usage curve divided by one million for plotting convenience, the plot labeled as CUMFUEL. Thus, the value at 16 hours of the CUMFUEL curve represents the total fuel usage in MMCF (Millions of Standard Cubic Feet) expended using the Example 1 manual control set.

Example 1 management of line pack during the 16 hours is shown in the upper right panel of FIG. 7. The left axis shows the pack in MMCF by pipe, and the right axis shows the total pack of the 311-mile system. Note the pack management with the manual control set ramps the total pack larger than will be needed in the final state. It is mostly the dissipation of this excess pack that seems to cause the transients in the pipeline system for the last 8 hours of the example.

EXAMPLE 2

Optimized Control Set

In Example 2, a control set determined by the optimization technique of the present invention is applied to the scenario used in Example 1 with the transition time being 8 hours. As noted above, the 8-hour transition time period, T, will be subdivided into 32 periods of 15 minutes each. For each quarter hour, a value is desired for the discharge pressure set point for each station, i.e., 224 numbers. Setpoints were updated at 15-minute intervals in this example, but less or more frequent updates are also perfectly permissible.

The optimization technique of the present invention produced the control set shown in the lower right panel of FIG. 8. The control set generated by the present invention is used to replace the "manual" control set used in Example 1. The control set illustrated in the lower right panel of FIG. 8 is remarkably smooth, indicating that the optimized solution is consistent with relatively slow changes in control set values except at points close to the beginning and end of the transition period.

However, to achieve the target state, the control set point values of both Examples 1 and 2 must coincide with those of the target state at 8 hours. The control set used in Example 2, similar to the control set used in Example 1, ramps the control setpoints up quickly after the transition begins, but not all the way to the target state value for the setpoints as was done in Example 1. In the upper left panel of FIG. 8, no compressor station S1–S7 attains the steady-state target fuel rate before the 8-hour transition is complete. Thus, it can be inferred that no compressor is ever limited in achieving its setpoint by available power and therefore, the discharge pressure for each compressor station always agrees with the optimized control set value. This performance contrasts strongly with that shown in the upper left panel of FIG. 7, where available power constraints dominated performance.

Further, the pack management in the upper right panel of FIG. 8 is quite different from that in FIG. 7. After the first hour the total pack rather smoothly ramps to its final value over the next six hours, then smoothly curves into its asymptotic steady-state value without overshooting the final value. The only overshoot in the pack of consequence in any pipe is that in pipe 7, wherein pipe 7 overpacks significantly just before the end of the 8-hour transition period.

During the early part of the 8-hour transition, the total fuel rate is remarkably constant, at a rate substantially less than the total fuel rate at target conditions as shown in the lower left panel of FIG. 8. This fuel rate contrasts significantly with the corresponding lower left panel of FIG. 7 which shows the total fuel rate of Example 1 to be comparable to or greater than the total fuel rate at target conditions shown in Example 2 for most of the transition time.

The integral of the fuel usage over the 8-hour transition period for Example 2 is about 17% less than the fuel usage of Example 1, which did not achieve the desired target state within that time period. However, the comparison at 8 hours is not quite appropriate insofar as Example 1, as mentioned, has not achieved the target state at the end of 8 hours while Example 2 has reached the target state at the end of the 8 hour transition time. As time progresses, Example 1 eventually converges to the specified optimal steady target state, and consequently the manual control does eventually (after around 16 hours) become close to optimal. Despite this eventual convergence and the averaging effect of long time intervals over sixteen hours, the optimal control set of Example 2 has still used 6% less fuel cumulatively.

Although there has been a major change in the delivery flow rate within the final hour of the transition, the optimal control set successfully achieved the target steady state within quite close tolerances as shown by the fuel usage rate and the line pack being essentially flat with time after 8 hours. Thus, the target steady state was approximated quite closely at that time by the control set obtained from the optimization technique of the present invention. Furthermore, the control set obtained from the optimization technique of the present invention shown in the bottom panel of FIG. 8 was still changing some values significantly during the period from 7 to 8 hours, yet the whole system settled quickly to the target steady state at the end of the 8-hour transition period.

Additionally, the minimization of fuel usage using the optimized control set of Example 2 is almost equivalent to the minimization of total theoretical power expended for compression because for most of the transition period the fuel rate is almost constant for each compressor station S1–S6 except for the small compressor station S7. Thus, for six of the compressor stations, the theoretical power is approximately a constant multiple of the fuel.

Next, the plot of the total theoretical power usage and its integral for both Examples 1 and 2 are shown in FIG. 9. The top left panel of FIG. 9 shows the theoretical power usage with time for each of the compressors using the Example 1 (manual) control set. The top right panel of FIG. 9 shows the total theoretical horsepower summed over all stations (on the left axis) and the integral of the power over time T expressed as millions of horsepower hours (on the right axis) for the control set of Example 1. The bottom panels of FIG. 9 show the corresponding plots for the control set of Example 2 (optimized).

The theoretical power enhances the understanding of how the power is used to carry out the required 8-hour transition. Furthermore, the frictional pressure losses can be used for understanding the power usage. During the simulation, sufficient information is obtained to permit computation of the frictional pressure loss throughout the gunbarrel pipeline system. The frictional pressure drop for each pipe can be computed as the integral along the length of the pipe of the friction factor times the density times the square of the velocity divided by pipe diameter converted to pressure units. Multiplying the frictional pressure drop calculated above by the area times the average velocity in the pipe and adjusting the units yields the rate of power loss due to friction along each pipe expressed as horsepower. Summing this power for all pipes yields the total instantaneous power loss due to friction. Integrating the latter with time yields the horsepower hours lost due to friction during the transition time. Thus, the power loss due to friction is comparable to the total theoretical horsepower expended by the compressor stations S1–S7. Further, it reveals how the power input is divided between losses due to friction and the potential energy delivered with the gas as pressure because the only ways in which theoretical power can be dissipated in the examples (in which the flow is assumed to be isothermal through horizontal pipes) is 1) dissipated through friction, 2) stored as potential energy in line pack and 3) delivered as potential energy in the delivered gas. Insofar as the required transition begins and ends at prescribed states, including Example 1 which eventually ends in the required end state, the power budget must be made up of frictionally dissipated power and power delivered as potential energy in the delivered gas. In these particular examples, the end delivery pressure is fixed, so that the only differences in potential energy in the delivered gas is the suction pressures at the stations where deliveries are made. Thus, overpressuring the system at these points would add to power costs and thus enter into the optimization of the control set.

The left panels of FIG. 10 show plots of the aforementioned frictional results for both Examples 1 and 2, respectively. The manual control set of Example 1 immediately produces a frictional power loss slightly in excess of the target state rate. The frictional power loss persists during the high packing rate shown in the upper right panel of FIG. 7. The frictional power loss then tapers off, and does not rise again until close to 16 hours when the target steady state is finally approximated. In contrast, the optimized control set of Example 2 early on produces somewhat less frictional power loss which quickly drops back to a nearly constant 75% of the target steady state frictional horsepower cost, maintaining this lower value until close to the end of the transition. Toward the end of the transition, the frictional horsepower cost rises quickly to the target value and remains there. At the end of 16 hours, the integral of the frictional power loss in Example 1 is about 4% larger than that in Example 2. Furthermore, the theoretical power expenditure by all compression stations S1–S7 was about 10% higher at the same 16 hours in Example 1 than in Example 2. However, if the frictional loss at the end of the transition time, 8 hours, is compared, then the frictional pressure horsepower loss in Example 1 is about 14% larger than in Example 2. Thus, one conclusion to be drawn is that the excess power goes to increase pack in Example 1 (see the upper right panel of FIG. 7) which is recovered to supply the frictional losses during the period between 8 and 16 hours. The pressure differential across compression stations S1–S7 is shown on the right-hand side of FIG. 10. The pressure differential across a compression station is the difference between the discharge pressure and the suction pressure. The differentials generated by compression stations S1, S2 and S4 in Example 1 are initially higher than for Example 2, but the differentials across most of the other stations do not appear to be significantly different.

However, in the case of compression station S7, the difference is striking. From the start until near the end of the 8-hour period the pressure differential at compression station S7 in Example 2 is negative. The negative differential indicates that compression station S7 throttles to maintain the discharge pressure, building pack in pipe 7, as discussed above. The throttling persists until shortly before the end of the transition when a release of the pipe 7 pack occurs in a precisely controlled way. Such management of line pack can be considered to be highly. surprising and counter-intuitive to an operator in view of the fact that there will be frictional losses associated with the throttling.

EXAMPLE 3

6 Hour Transition Time

The comparison between Examples 1 and 2 shows that the technique of the present invention accomplishes achieving the required state in the required length of time and significantly lessening fuel and theoretical power usage. Example 2 showed that in moving from a low rate situation to a high rate in a period of 8 hours, the transition could be made without using more power at any station than was required at that station for the steady target state.

However, in Example 3 a different scenario is used to evaluate the optimization technique of the present invention. In the Example 3 scenario, more power is made available to the compression stations S1–S7 than in Examples 1 and 2. Additionally, the transition time to reach the target state is now 6 hours instead of the 8 hours used for Examples 1 and 2. Furthermore, in the Example 3 scenario a goal of minimizing total horsepower-hour usage during the transition is used instead of the fuel minimization goal of Examples 1 and 2. The required minimum and maximum pressure constraints are continued from Examples 1 and 2. The supply/delivery rates shown in the lower left panel of FIG. 6 were modified for Example 3 because changes in the delivery at compressor station S6 and at the end delivery station were still being made between 6 and 8 hours as seen in FIG. 6. These changes in delivery were moved earlier so as to occur before the end of the transition time at 6 hours. Specifically, the end delivery was ramped from 480 to 780 MMCFD between 5 and 5.5 hours, and then on to agree with the target rate between 5.5 hours and 6 hours. Delivery for compression station S6 was also ramped from 270 to 120 MMCFD between 5 and 5.5 hours. The delivery schedule for Example 3 is shown graphically in the lower left panel of FIG. 12. The corresponding information and results for Example 3 are summarized in FIGS. 11 and 12. In FIG. 12, the time scale is plotted different from that of FIG. 11 to allow for more detail in the graphs by removing some of the steady-state part of the results.

The control set generated by the optimization technique of the present invention for Example 3 is shown in the lower right panel of FIG. 11. The control set generated for Example 3 is qualitatively similar to the one used in Example 2. The resulting power usage is shown in the upper left panel of FIG. 11. While similar to the power usage used in Example 2, the power used at each compressor station S1–S7 substantially exceeds its power in the target steady state at some point during the transition time. There is also substantially more variation with time of the power usage at compressor stations S4–S7 than occurred during the longer transition period of Example 2 (see the upper left panel of FIG. 8.) The instantaneous horsepower usage and the integral of the usage is shown for Example 3 for a 12-hour period in the lower left panel of FIG. 11. The total power usage is initially lower than the usage rate in the target steady state, however, the usage rises steeply after about 4 hours and oscillates until shortly before the end of the 6-hour period.

The linepack for Example 3 very smoothly rises to its target steady state value without any overshoot as shown in the upper right panel of FIG. 11, similar to its counterpart for Example 2 shown in FIG. 8. Comparing the linepack management between Examples 2 and 3 shows why Example 3 requires more power. In both cases the pack increases from 508 to 572, or 64 MMCF. In Example 2 this is distributed over 8 hours, for an average rate of 64×24/8=192 MMCFD added to the underlying deliveries. In Example 3the extra pack is distributes over 5 hours which corresponds to 64×24/6=256 MMCFD, a substantial friction increase in the load.

Again pipe 7 pack is managed so as to achieve the necessary damping of transients in approaching the target. But in contrast to Example 2, in which only pipe 7 pack exceeded the target pack, in Example 3, pipes 4 and 5 are also overpacked during the transition period T.

However, even though pipes 4, 5, and 7 are overpacked in Example 3, the total pack for Example 3 did not exceed the target.

Comparing the friction power loss as shown in the upper left panel in FIG. 12 with the total theoretical power as shown in the lower left panel of FIG. 11 illustrates that frictional loss tracks the total power input quite closely. Again, recall the time scale plotted in FIG. 12 spans only 8 hours instead of the 12-hour span of FIG. 11. At the target state, friction accounts for about 85% of the power input. The discharge flow rates from all the compressor stations S1–S7 in the lower right panel of FIG. 12 illustrates that apart from an initial surge, the flows through each of compressor stations S1–S3 (where heavy power inputs occur) maintain rates that are reasonably constant during the first four hours of the six-hour transition.

The reasonably constant flows through each of compressor stations S1–S3 is plausible because friction uses the dominant part of the power budget, and for a given throughput the frictional losses will be minimized if the flow is maintained at a constant rate rather than undergoing substantial changes. The flow is maintained at a fairly constant rate because the frictional power loss over T is proportional to the integral over T of the cube of the flow divided by the square of the average density. Additionally, there is a side relation that the integral of the flow over T be the required delivery. So to minimize the integral of the cube of flow subject to holding the integral of flow constant, the flow should be maintained as nearly constant as possible. It is interesting that the control set that is generated by the technique of the present invention in this scenario produces flows consistent with the foregoing simple analysis of the frictional budget.

The suction pressures by compressor station S1–S7 shown in the upper right panel of FIG. 12, illustrate that Example 3 does not violate the minimum pressure constraint at any compressor station. Comparison of the suction and discharge pressures (see the lower right panel of FIG. 11) at compressor station S7 shows that for a time between 4 and 5 hours, compressor station S7 functions as a pressure reducing station rather than a compressor station, throttling gas to manage pipe 7 linepack. The pressure is built up in pipe 7 in the period before the end of the transition for use in damping the transients through a precisely controlled release just before 6 hours.

The optimization technique of the present invention as applied to Example 3 revealed the following: 1) the target state can in fact be achieved in 6 hours; 2) the target state cannot be achieved without increasing the horsepower above that required in the target state, and it can be achieved if theoretical power is available at the seven stations, respectively, as follows: 18000, 18500, 11500, 14500, 11500, 14500, and 9000 HP; 3) the theoretical power required in Example 3 is shown in FIGS. 11; and 4) the control pressures should be adjusted with time as shown also in the lower right panel of FIG. 11 to achieve the target state.

EXAMPLE 4

1 Hour Intervals

In the above Examples, the point was made that there is substantial flexibility in the choice of the time intervals during the transition time T on which the control set values are determined. In Example 2, the control set values for each of the compressor station S1–S7 were determined on 15-minute intervals, as in all of the other above examples. Example 4 addresses the scenario where updating of the control setpoint values occurs every hour during the 8-hour transition period instead of every 15-minutes as done in Example 2.

In Example 4, the control set values were determined on 1-hour intervals, thereby reducing the number of control set values determined by the technique of the present invention and the number of adjustments in target setpoints for the compressor stations S1–S7 by a factor of four. FIG. 13 shows the same results for Example 4 as those shown in FIG. 8 for Example 2. Comparing the lower right panels of FIGS. 13 and 8 show substantial similarities in control set values. The control set values determined by the present invention for Example 4 are a great deal coarser than that of Example 2, but, the quality of the optimized solution only varies slightly. For example, we see that the fuel rate undergoes somewhat more change following the 8-hour transition than it does in Example 2. Insofar as the target state is steady, attaining it at T=8 hours would result in a constant fuel rate at 8 hours. While neither the fuel rates of Example 2 or Example 4 is exactly constant at the end of the transition period, it changes more after 8 hours in Example 4 than it does in Example 2 as evidenced by a comparison of the upper left panels of the two figures. Thus, the state acquired by the control set of Example 2 got closer to the target than the control set of Example 4. The 8-hr fuel usage in Example 2 is 3.833 MMCF, while the fuel usage of Example 4 is 3.990 MMCF, or 4% more as shown in the lower left panels of FIGS. 8 and 13.

EXAMPLE 5

5 Minute Intervals

Example 5 was simulated using the same deliveries and target time as Example 2 except with 5-minute intervals for determining discharge control setpoint values instead of the 15-minute intervals used in Example 2. Example 5 determined the 8-hour fuel usage to be 3.799 MMCF, or approximately 0.9% less than that for Example 2. The control set values generated by the present invention for Example 5 are not significantly different from the control set values of Example 2. Example 5 has only a somewhat sharper rise in the control setpoints at the start, and a bit more fine structure near the end of the transition. Therefore, the character of the determined optimized control set remains essentially unchanged between Example 2, using 15-minute intervals and calculating 224 control set numbers and Example 5, using 5-minute intervals and determining 672 control set numbers for the same physical scenario.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method of formulating an optimal set of controls to transit a pipeline from an initial state to a sustainable target state over a preselected time period, the pipeline comprising a plurality of control devices and the preselected time period having a plurality of discrete intermediate times, said method comprising the steps of:

generating a set of controls capable of transitioning the pipeline from the initial state to the sustainable target state, the set of controls having a plurality of control values for each control device of the plurality of control devices and each control value of the plurality of control values for each control device corresponds to a discrete intermediate time of the plurality of discrete intermediate times;

simulating a state of the pipeline using the set of controls for each of the plurality of discrete intermediate times from the start of the preselected time period to the end of the preselected time period, each state of the pipeline including a plurality of state variables representing conditions of the pipeline at discrete points along the pipeline;

calculating a total cost for the simulation of the set of controls with a cost functional;

modifying the set of controls to generate an updated set of controls having a lower calculated total cost; and repeating said steps of simulating, calculating, and modifying with updated sets of controls until the updated set of controls is an optimal set of controls, wherein the optimal set of controls has a minimum total cost.

2. The method of claim 1, further comprising the step of calculating the sustainable target state externally with steady-state optimization software.

3. The method of claim 1, further comprising the step of calculating the sustainable target state by computing control values to obtain a state of the pipeline that does not change during the discrete intermediate time occurring immediately before the end of the preselected time period.

4. The method of claim 1, wherein the total cost for the simulation of the pipeline using the set of controls includes aggregate operational costs during the preselected time period and penalties for failing to achieve the target state at the end of the preselected time period.

5. The method of claim 1, further comprising the step of calculating an intermediate cost increment for each discrete intermediate time of the plurality of discrete intermediate times.

6. The method of claim 4, wherein the aggregate operational costs includes at least one of fuel costs, power costs and gas emission costs.

7. The method of claim 6 further comprising the step of evaluating and saving a derivative of the intermediate cost increment with respect to the plurality of state variables for each discrete intermediate time of the plurality of discrete intermediate times.

8. The method of claim 7, further comprising the steps of:

calculating a final cost increment for the state of the pipeline at the end of the preselected time period;

evaluating, at the end of the preselected time period, derivatives of the final cost increment with respect to the plurality of state variables, wherein the derivatives at the end of the preselected time period are non-zero if the simulated state differs from the target state;

evaluating an adjoint solution for each of the plurality of intermediate times with the evaluated derivatives, beginning at the end of the preselected time period and proceeding back to the start of the preselected time period time by incorporating the saved derivatives for each discrete intermediate time of the plurality of intermediate times; and combining the adjoint solutions developed at all discrete intermediate times from the end of the preselected time period to the start of the preselected time period to generate a gradient.

9. The method of claim 8, wherein said step of modifying the set of controls includes the step of changing the plurality of control values using the gradient.

10. The method of claim 8, further comprising the steps of:

evaluating a second derivative with respect to the plurality of state variables for each cost increment; and said step of modifying the set of controls includes the step of modifying the plurality of control values using the gradient and the evaluated second derivatives.

11. A method for computing a cost gradient for a control set for use in generating an optimal control set to transit a pipeline from an initial state to a sustainable target state over a preselected time period having a plurality of discrete intermediate times, said method comprising the steps of:

simulating a state of the pipeline at each of the plurality of discrete intermediate times from the start of the preselected time period to the end of the preselected time period using the set of controls, the state of the pipeline having a plurality of state variables representing conditions of the pipeline at discrete points along the pipeline;

calculating a cost associated with the state of the pipeline at each of the plurality of discrete intermediate times and at the end of the preselected time period;

evaluating, with respect to the plurality of state variables, derivatives of the cost associated with the state of the pipeline at each of the plurality of discrete intermediate times and with the state of the pipeline at the end of the preselected time period;

evaluating an adjoint solution for each of the plurality of discrete intermediate times with the evaluated derivatives beginning at the end of the preselected time period and proceeding back to the start of the preselected time period time by incorporating the evaluated derivatives from each of the plurality of discrete intermediate times; and combining the adjoint solutions evaluated at the plurality of discrete intermediate times from the end of the preselected time period to the start of the preselected time period to generate a cost gradient.

12. The method of claim 11, further comprising the step of storing the evaluated derivatives of the cost.

13. The method of claim 11, wherein the step of evaluating an adjoint solution includes the step of generating a LaGrange Multiplier for each of the plurality of discrete intermediate times starting with the end of the preselected time period.

14. The method of claim 11, wherein the cost associated with the state of the pipeline includes at least one of fuel costs, power costs and gas emission costs.

15. A method of transitioning a pipeline from a first state to a second state over a predetermined time period comprising the steps of:

dividing the predetermined time period into a plurality of discrete time segments;

calculating a first state of the pipeline at the start of the predetermined time period, the state of the pipeline having a plurality of state variables representing conditions of the pipeline at discrete points along the pipeline;

calculating a second state of the pipeline to be achieved at the end of the predetermined time period;

generating a valid and feasible set of controls capable of transitioning the pipeline from the first state of the pipeline to a final state of the pipeline at the end of the predetermined time period;

simulating a state of the pipeline at each of the plurality of discrete time segments from the first state of the pipeline at the start of the predetermined time period to the final state of the pipeline at the end of the predetermined time period using the valid and feasible set of controls;

calculating a cost associated with the state of the pipeline at each of the plurality of discrete time segments and with the final state of the pipeline at the end of the predetermined time period and summing each of the calculated costs to determine a total cost for the valid and feasible set of controls;

evaluating, with respect to the plurality of state variables, first derivatives and second derivatives of the cost associated with the state of the pipeline at each of the plurality of discrete time segments and with the final state of the pipeline at the end of the predetermined time period;

evaluating an adjoint solution for each of the plurality of discrete time segments with the evaluated first derivatives beginning at the end of the predetermined time period and proceeding back to the start of the predetermined time period time by incorporating the evaluated first derivatives from each of the plurality of discrete time segments;

combining the adjoint solutions evaluated at the plurality of discrete time segments from the end of the predetermined time period to the start of the predetermined time period to generate a gradient;

modifying the set of controls using the gradient and the second derivatives to generate an updated set of controls having a lower total cost; and repeating said steps of simulating, calculating, evaluating first and second derivatives, evaluating an adjoint solution, combining the adjoint solutions and modifying with updated sets of controls until the updated set of controls is an optimal set of controls, wherein the optimal set of controls has a minimum total cost.

16. The method of claim 15, wherein the second state of the pipeline is a sustainable second state and comprising the step of computing the sustainable second state with steady-state optimization software.

17. The method of claim 15, wherein the second state of the pipeline is a sustainable second state and comprising the step of calculating the sustainable second state by determining a state of the pipeline that does not change during the discrete time segment occurring immediately before the end of the predetermined time period.

18. The method of claim 15, wherein the total cost for the valid and feasible set of controls includes aggregate operational costs during the predetermined time period and penalties for failing to achieve the target state at the end of the predetermined time period.

19. The method of claim 15, wherein said step of modifying the set of controls includes the steps of:

generating a modification step from the gradient and the second derivatives; and adding the modification step to the set of controls to generate the updated set of controls.

20. The method of claim 15, wherein said step of simulating a state of the pipeline includes satisfying any designated loads occurring at stated points on the pipeline.

21. The method of claim 18, wherein the aggregate operational costs includes at least one of fuel costs, power costs and gas emission costs.

22. The method of claim 19, wherein said step of generating a modification step includes the step of generating the modification step with a Trust Region Method.

23. A computer program product embodied on a computer readable medium and executable by a computer for determining an optimal set of controls for devices in a pipeline to transition the pipeline from a first state to a sustainable second state over a preselected time period, said computer program product comprising instructions for executing the steps of:

dividing the preselected time period into a plurality of discrete intermediate times;

generating a valid and feasible set of controls capable of transitioning the pipeline from the first state of the pipeline to a final state of the pipeline at the end of the preselected time period;

simulating a state of the pipeline at each of the plurality of discrete intermediate times from the first state of the pipeline at the start of the preselected time period to the final state of the pipeline at the end of the preselected time period using the valid and feasible set of controls, the state of the pipeline including a plurality of state variables representing conditions of the pipeline at discrete points along the pipeline;

calculating a total cost for the simulated set of controls using a cost functional;

computing a gradient of the cost functional;

modifying the set of controls using the gradient to generate an updated set of controls having a lower calculated total cost; and repeating said steps of simulating, calculating, computing and modifying with updated sets of controls until the updated set of controls is an optimal set of controls, wherein the optimal set of controls has a minimum total cost.

24. The computer program product of claim 23, further comprising instructions for executing the step of calculating the sustainable second state with steady-state optimization software.

25. The computer program product of claim 23, further comprising instructions for executing the step of calculating the sustainable target state by determining a state of the pipeline that does not change during the discrete intermediate time occurring immediately before the end of the preselected time period.

26. The computer program product of claim 23, wherein the total cost for the simulated set of controls includes aggregate operational costs during the preselected time period and penalties for failing to achieve the second state at the end of the preselected time period.

27. The computer program product of claim 23, further comprising instructions for executing the step of calculating an intermediate cost increment for each discrete intermediate time of the plurality of discrete intermediate times.

28. The computer program product of claim 26, wherein the aggregate operational costs includes at least one of fuel costs, power costs and gas emission costs.

29. The computer program product of claim 28, further comprising instructions for executing the step of evaluating and saving a derivative of the intermediate cost increment with respect to the plurality of state variables for each discrete intermediate time of the plurality of discrete intermediate times.

30. The computer program product of claim 29, further comprising instructions for executing the steps of:

calculating a final cost increment for the final state of the pipeline at the end of the preselected time period;

evaluating, at the end of the preselected time period, derivatives of the final cost increment with respect to the plurality of state variables, wherein the derivatives at the end of the preselected time period are non-zero if the final state of the pipeline at the end of the preselected time differs from the second state;

evaluating an adjoint solution for each of the plurality of discrete intermediate times with the evaluated derivatives beginning at the end of the preselected time period and proceeding to the start of the preselected time period time by incorporating the saved derivatives for each discrete intermediate time of the plurality of discrete intermediate times; and combining the adjoint solutions developed at all discrete intermediate times from the end of the preselected time period to the start of the preselected time period to generate the gradient.

31. The computer program product of claim 29, further comprising instructions for executing the steps of:

evaluating a second derivative of the cost functional with respect to the plurality of state variables;

generating a modification step from the gradient and the second derivative; and adding the modification step to the set of controls to generate the updated set of controls.

32. A system for determining an optimal set of control values for control devices in a pipeline to transition the pipeline from a first state to a second state over a predetermined time period, said system comprising:

a plurality of sensors located on the pipeline to measure characteristics of the pipeline;

a control and data acquisition system to receive measurements from said plurality of sensors and to apply control values to the control devices of the pipeline;

a pipeline state calculator to generate the first state of the pipeline at the start of the predetermined time period using said measurements received by said control and data acquisition system;

a load forecaster to predict future loads at specific points along the pipeline;

a control set optimizer to generate an optimal control set for the control devices of the pipeline, said control set optimizer using a starting control set, the first state of the pipeline from said pipeline state calculator, the second state of the pipeline and said predicted future loads from said load forecaster to generate said optimal control set, and said control set optimizer comprising:

means for dividing the predetermined time period into a plurality of discrete time segments;

means for generating a valid and feasible set of controls capable of transitioning the pipeline from the first state of the pipeline to a final state of the pipeline at the end of the predetermined time period; and means for iteratively modifying said valid and feasible set of controls until the optimal set of controls is obtained; and said optimal control set being transmitted to said control and data acquisition system for application to the control devices of the pipeline.

33. The system of claim 32 further comprising a steady-state optimizer to generate the second state of the pipeline using said predicted future loads from said load forecaster.

34. The system of claim 32 further comprising a predictive simulation system to simulate application of said optimal control set from said control set optimizer on the pipeline.

35. The system of claim 32 wherein said means for iteratively modifying said valid and feasible set of controls comprises:

means for simulating a state of the pipeline at each of the plurality of discrete time segments from the first state of the pipeline at the start of the predetermined time period to the final state of the pipeline at the end of the predetermined time period using said valid and feasible set of controls, said state of the pipeline having a plurality of state variables representing conditions of the pipeline at discrete points along the pipeline;

means for calculating a cost associated with said state of the pipeline at each of said plurality of discrete time segments and with said final state of the pipeline at the end of the predetermined time period and summing each of said calculated costs to determine a total cost for said valid and feasible set of controls;

means for evaluating, with respect to said plurality of state variables, first derivatives and second derivatives of the cost associated with said state of the pipeline at each of said plurality of discrete time segments and with said final state of the pipeline at the end of the predetermined time period;

means for evaluating an adjoint solution for each of the plurality of discrete time segments with the evaluated first derivatives beginning at the end of the predetermined time period and proceeding back to the start of the predetermined time period time by incorporating the evaluated first derivatives from each of the plurality of discrete time segments;

means for combining the adjoint solutions evaluated at the plurality of discrete time segments from the end of the predetermined time period to the start of the predetermined time period to generate a gradient; and means for modifying the set of controls using the gradient and the second derivatives to generate an updated set of controls having a lower total cost.

36. The system of claim 35, wherein said total cost for said valid and feasible set of controls includes aggregate operational costs during the predetermined time period and penalties for failing to achieve the second state at the end of the predetermined time period.

37. The system of claim 35, wherein said means for modifying the set of controls comprises:

means for generating a modification step from the gradient and the second derivatives; and means for adding said modification step to said valid and feasible set of controls to generate said updated set of controls.

38. The system of claim 35, wherein said means for evaluating an adjoint solution includes means for generating a LaGrange Multiplier for each of said plurality of discrete time segments starting with the end of the predetermined time period.

39. The system of claim 36, wherein the aggregate operational costs includes at least one of fuel costs, power costs and gas emission costs.

* * * * *